US009654947B2

(12) United States Patent
Kawashima et al.

(10) Patent No.: US 9,654,947 B2
(45) Date of Patent: *May 16, 2017

(54) LINE CONNECTION APPARATUS AND METHOD

(71) Applicant: FUJITSU LIMITED, Kawasaki-shi, Kanagawa (JP)

(72) Inventors: Naoto Kawashima, Yokohama (JP); Naoto Matsudaira, Yokohama (JP); Yuusuke Tounai, Nishi (JP); Hiroshi Yoshida, Yokohama (JP); Shingo Hirono, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/021,411

(22) Filed: Sep. 9, 2013

(65) Prior Publication Data
US 2014/0010359 A1 Jan. 9, 2014

Related U.S. Application Data

(63) Continuation of application No. PCT/JP2011/056464, filed on Mar. 17, 2011.

(51) Int. Cl.
| H04W 4/16 | (2009.01) |
| H04M 3/428 | (2006.01) |
| H04M 3/42 | (2006.01) |
| H04M 3/48 | (2006.01) |

(52) U.S. Cl.
CPC .............. *H04W 4/16* (2013.01); *H04M 3/428* (2013.01); *H04M 3/42059* (2013.01);
(Continued)

(58) Field of Classification Search
USPC ..... 379/265.01, 265.02, 393, 207.04–207.07
See application file for complete search history.

(56) References Cited

U.S. PATENT DOCUMENTS 5,537,470 A * 7/1996 Lee ........................... 379/265.11
6,473,437 B2 * 10/2002 Stumer ......................... 370/462
(Continued)

FOREIGN PATENT DOCUMENTS

| JP | 4-223543 | 8/1992 |
| JP | 5-83386 | 4/1993 |

(Continued)

OTHER PUBLICATIONS

International Search Report mailed Jun. 28, 2011 in corresponding International Application No. PCT/JP2011/056464.
(Continued)

*Primary Examiner* — Harry S Hong
(74) *Attorney, Agent, or Firm* — Staas & Halsey LLP

(57) ABSTRACT

A line connection apparatus is disclosed. To hold a line, on-hook is set to a first terminal of a first person who holds the line to output voice of a second person for whom the line is held from the first terminal. First identification of the first person is recorded by corresponding to second identification of the second person. To set a lock, when the disconnection of the line being held is recognized, a connection condition to lock the line is acquired from the first person, for the first terminal to receive a re-connection request from a same second person who disconnects the line in a hold state. To control a connection in response to the re-connection request by the same second person, the first terminal is controlled to receive the re-connection request based on the first identification corresponding to the second identification indicated by the re-connection request.

9 Claims, 17 Drawing Sheets

(52) U.S. Cl.
CPC .......... *H04M 3/42102* (2013.01); *H04M 3/48* (2013.01); *H04M 2203/2088* (2013.01)

(56) References Cited

U.S. PATENT DOCUMENTS

| | | | |
|---|---|---|---|
| 9,178,993 B2* | 11/2015 | Kawashima | H04M 3/428 |
| 2005/0047576 A1 | 3/2005 | Hidesawa et al. | |
| 2005/0147227 A1* | 7/2005 | Chervirala et al. | 379/215.01 |
| 2012/0099721 A1* | 4/2012 | Peterson et al. | 379/266.01 |
| 2012/0155629 A1* | 6/2012 | Morken et al. | 379/229 |
| 2014/0016771 A1* | 1/2014 | Kawashima et al. | 379/372 |

FOREIGN PATENT DOCUMENTS

| | | |
|---|---|---|
| JP | 5-206937 | 8/1993 |
| JP | 6-37895 | 2/1994 |
| JP | 6-232975 | 8/1994 |
| JP | 9-200340 | 7/1997 |
| JP | 2000-83098 | 3/2000 |
| JP | 2004-227228 | 8/2004 |
| JP | 2005-72936 | 3/2005 |
| JP | 2008-219826 | 9/2008 |
| JP | 2009-218815 | 9/2009 |

OTHER PUBLICATIONS

Patent Abstracts of Japan, Publication No. 04-223543, Published Aug. 13, 1992.
Patent Abstracts of Japan, Publication No. 05-083386, Published Apr. 2, 1993.
Patent Abstracts of Japan, Publication No. 05-206937, Published Aug. 13, 1993.
Patent Abstracts of Japan, Publication No. 06-037895, Published Feb. 10, 1994.
Patent Abstracts of Japan, Publication No. 06-232975, Published Aug. 19, 1994.
Patent Abstracts of Japan, Publication No. 09-200340, Published Jul. 31, 1997.
Patent Abstracts of Japan, Publication No. 2000-083098, Published Mar. 21, 2000.
Patent Abstracts of Japan, Publication No. 2004-227228, Published Aug. 12, 2004.
Patent Abstracts of Japan, Publication No. 2005-072936, Published Mar. 17, 2005.
Patent Abstracts of Japan, Publication No. 2008-219826, Published Sep. 18, 2008.
Patent Abstracts of Japan, Publication No. 2009-218815, Published Sep. 24, 2009.
Office Action dated Nov. 25, 2014 in U.S. Appl. No. 14/025,167.
Office Action dated Mar. 28, 2014 in U.S. Appl. No. 14/025,167.
Notice of Allowance dated May 8, 2015 in U.S. Appl. No. 14/025,167.
Chinese Office Action dated Dec. 9, 2014 in Appln. No. 201180069328.3.
U.S. Appl. No. 14/025,167, filed Sep. 12, 2013, Kawashima et al., Fujitsu Limited.

* cited by examiner

FIG.7A

31 OPERATOR DB

| OPERATOR ID | CONNECTION STATE |
|---|---|
| OP11111 | LOCKED |
| OP22222 | AVAILABLE |
| OP33333 | BUSY |
| OP44444 | HOLD |
| OP55555 | LOCKED |
| .. | .. |

FIG.7B

32 CONNECTION CONTROL DB

| OPERATOR ID | CUSTOMER TELEPHONE NUMBER | 32a CONNECTION CONDITION | | LOCK TIME |
|---|---|---|---|---|
| | | CONNECTION METHOD | LOCK TIME STANDARD VALUE | |
| OP44444 | 090-1111-2222 | | | — |
| OP11111 | 090-3333-4444 | HOLD | 3 MIN | 2010/09/30 10:20:55 TO 10:23:55 ↑ +3 MIN |
| OP55555 | 090-5555-6666 | CALL | 1 MIN | 2010/09/30 10:20:50 TO 10:21:50 ↑ +1 MIN |
| .. | .. | .. | | .. |

LINE CONNECTION APPARATUS AND METHOD

CROSS-REFERENCE TO RELATED APPLICATION

This application is a continuation of International Application PCT/JP2011/056464 filed on Mar. 17, 2011 and designated the U.S., the entire contents of which are incorporated herein by reference.

FIELD

The present invention is related to a re-connection of a telephone line which is disconnected after being held.

BACKGROUND

Conventionally, in a case of a telephone call, the telephone call is received in response to a connection request from a caller. For a case in which a line is set to a hold state in order to respond to an inquiry, a request, and the like from a caller, there are various approaches to release the hold state by a held side.

A technology is presented in that a special number is dialed at a held side to send a hold release request signal or the like, and a speaker of a telephone at a holding side is turned on to communicate with a person with voice at the holding side. A technology is presented in that a message recorded by the held side is corresponded to a telephone number of the holding side. A technology is also presented in that a held person reports a disconnection of communication during the hold state.

In addition, a technology is presented to recover a communication state by releasing the hold state when a re-connection is available within a predetermined time after a call is set to the hold state in response to the communication state or a remaining battery level of a wireless communication terminal. A technology is also presented to record a telephone number of the held side when a connection is disconnected at the held side during the hold state and to re-connect from the hold side. Moreover, a technology is presented to connect beforehand in an occupied state, and to re-connect by a correspondence of an occupation character string pertinent to the connection after a disconnection.

PATENT DOCUMENTS

Patent Document 1: Japanese Laid-open Patent Publication No. 2000-83098
Patent Document 2: Japanese Laid-open Patent Publication No. H06-37895
Patent Document 3: Japanese Laid-open Patent Publication No. H09-200340
Patent Document 4: Japanese Laid-open Patent Publication No. 2008-219826
Patent Document 5: Japanese Laid-open Patent Publication No. H05-206937
Patent Document 6: Japanese Laid-open Patent Publication No. H06-232975
Patent Document 7: Japanese Laid-open Patent Publication No. H05-83386
Patent Document 8: Japanese Laid-open Patent Publication No. H04-223543

SUMMARY

According to one aspect of an embodiment, there is provided a line connection apparatus, including a processor; and a storage part; wherein the processor performs holding a line when a hold is recognized, by setting on-hook to a first person terminal of a first person who holds the line so as to output voice of a second person for whom the line is held from the first person terminal, and recording first person identification information by corresponding to second person identification information in a connection database stored in the storage part, the first person identification information identifying the first person, the second person identification information identifying the second person, the connection database for managing holding a line and releasing a hold of the line; setting a lock by acquiring a connection condition to lock the line in order for the first person terminal to receive a re-connection request from a same second person which is made after a disconnection in a hold state, from the first person based on the first person identification information in which the line is disconnected, when the disconnection of the line being held is recognized, and storing the connection condition by corresponding to the first person identification information; and controlling a connection, in response to the re-connection request by the same second person, by referring to the connection control database stored in the storage part, and having the first person terminal receive the re-connection request based on the first person identification information corresponding to the second person identification information in accordance with the connection condition corresponding to the second person identification information indicated by the re-connection request.

According to other aspects of the embodiment, there may be provided a line connection method, and a non-transitory computer-readable recording medium to cause a computer to function as the above described apparatus.

The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

BRIEF DESCRIPTION OF DRAWINGS

FIG. 7A is a diagram illustrating a data configuration example of an operator DB,
and FIG. 7B is a diagram illustrating a data configuration example of a connection control DB.

DESCRIPTION OF EMBODIMENT

By using related arts, it becomes possible to resume a telephone communication from a held side in a middle of a hold state set at a holding side. However, even if a telephone communication is resumed in the middle of the hold state, a person at the holding side (hereinafter, called "holding person") and a person at the held side (hereinafter, called "held person") conduct various operations to re-connect a line after a disconnection of the line, and it will be explained for a situation before and after the disconnection.

For an operator service such as a call center to correspond to an inquiry, a request, and the like of a customer, a telephone, which is recently and widely used, is generally used to respond to the inquiry or the like. In the operator service, an operator may hold a call to respond to the inquiry. In a hold state, the line may be temporarily disconnected by a telephone of the customer at a held side due to a use circumstance of the telephone of the customer or may be intentionally disconnected by the customer. There is a case in which the customer attempts to connect again a few minutes later. In this case, a line connection apparatus may refer to a customer correspondence history, and may have the operator, who holds a previous connection, re-connect the line for the customer.

However, the operator holding the previous connection has been working to answer the inquiry. The operator may not be aware of the disconnection made by the customer, and may concentrate on his/her work or may not be at his/her desk for a search. Hence, when a customer is re-connected through the utterance of their voice, the operator temporarily stops work and a search in process, purposely conducts an operation to respond to an incoming call, and initiates a conversational interaction with the customer. The work being conducted by the operator is interrupted to respond to the customer due to the re-connection. Thus, since the operator may not concentrate on his/her work, the response to the customer may not be effectively performed by the operator. In addition, it is difficult for the operator to comprehend when the line is disconnected and in what circumstance the line is disconnected. In this case, the work by the operator in process during the hold state may be in vain. Moreover, it is difficult for the operator to properly respond to the customer when the line is re-connected.

Figure 1:
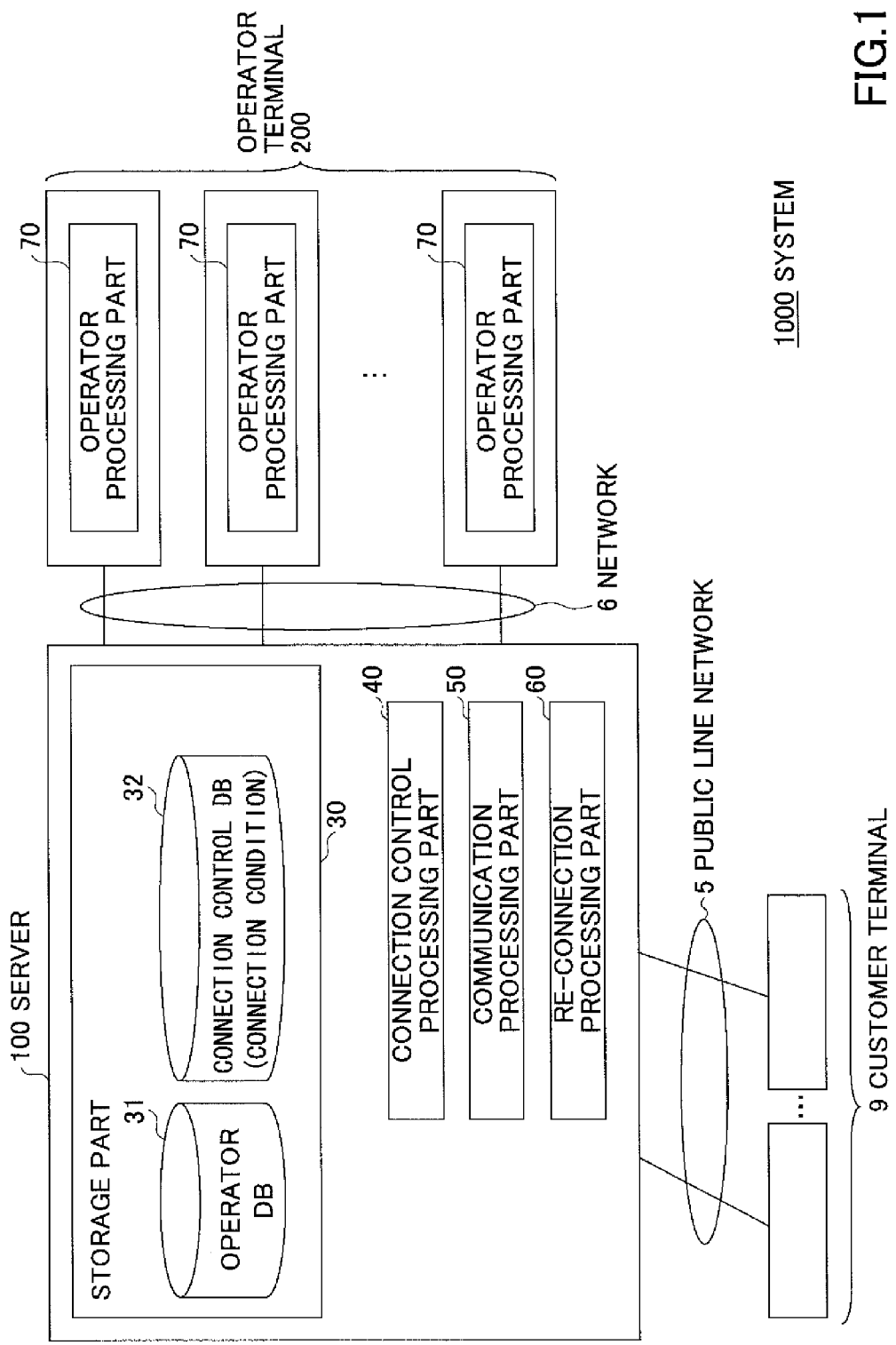
FIG. 1 is a diagram illustrating a system configuration example according to an embodiment.

In the following, an embodiment of the present invention will be described with reference to the accompanying drawings. FIG. 1 is a diagram illustrating a system configuration example according to the embodiment. A system 1000 illustrated in FIG. 1 includes a server 100, multiple customer terminals 9, and multiple operator terminals 200. The server 100 is connected to the multiple customer terminals 9 through a public line network 5. Also, the server 100 is connected to the multiple operator terminals 200 through a network 6.

The server 100 corresponds to a line connection apparatus placed at the call center concerning a service, and conducts a connection process and a disconnection process pertinent to a communication between a customer terminal 9 of a customer who inquires and an operator terminal 200 of an operator who corresponds to the inquiry of the customer. The server 100 includes a connection control processing part 40, a communication processing part 50, and a re-connection processing part 60. The server 100 determines whether a connection request of the customer terminal 9 from the public line network 5 is made due to the re-connection or is a regular connection, and intermediates a communication with the operator terminal 200. Also, the server 100 stores an operator database (DB) 31, and a connection control DB 32 in a storage part 30. Each of the parts 40, 50, and 60, and the databases 31 and 32 will be described later.

In the embodiment, the re-connection is performed to accept the connection request from the customer terminal 9 after the customer terminal 9 disconnects a previous line connection which was made and has been in the hold state within a predetermined time. In the re-connection in the embodiment, in response to a hold response instruction from the server 100, the same operator terminal 200 automatically receives a call of the reconnection, instead of an operation for responding to the hold response instruction and receiving the call (a responding and receiving operation) by the operator.

On the other hand, in the regular connection, a first connection request is received in which the connection request has not received from the same customer terminal 9 within the predetermined time. The first connection request is established by the operator operating to accept and respond the first connection request (an accepting and responding operation).

Each of the multiple operator terminals 200 is regarded as a terminal used by the operator, who handles the inquiry of the customer, such as a cellular phone or a mobile communication terminal including a phone function. Each of the multiple operator terminals 200 includes an operator processing part 70 for communicating with the customer terminal 9 and conversationally interacting with the customer through the server 100.

Figure 2:
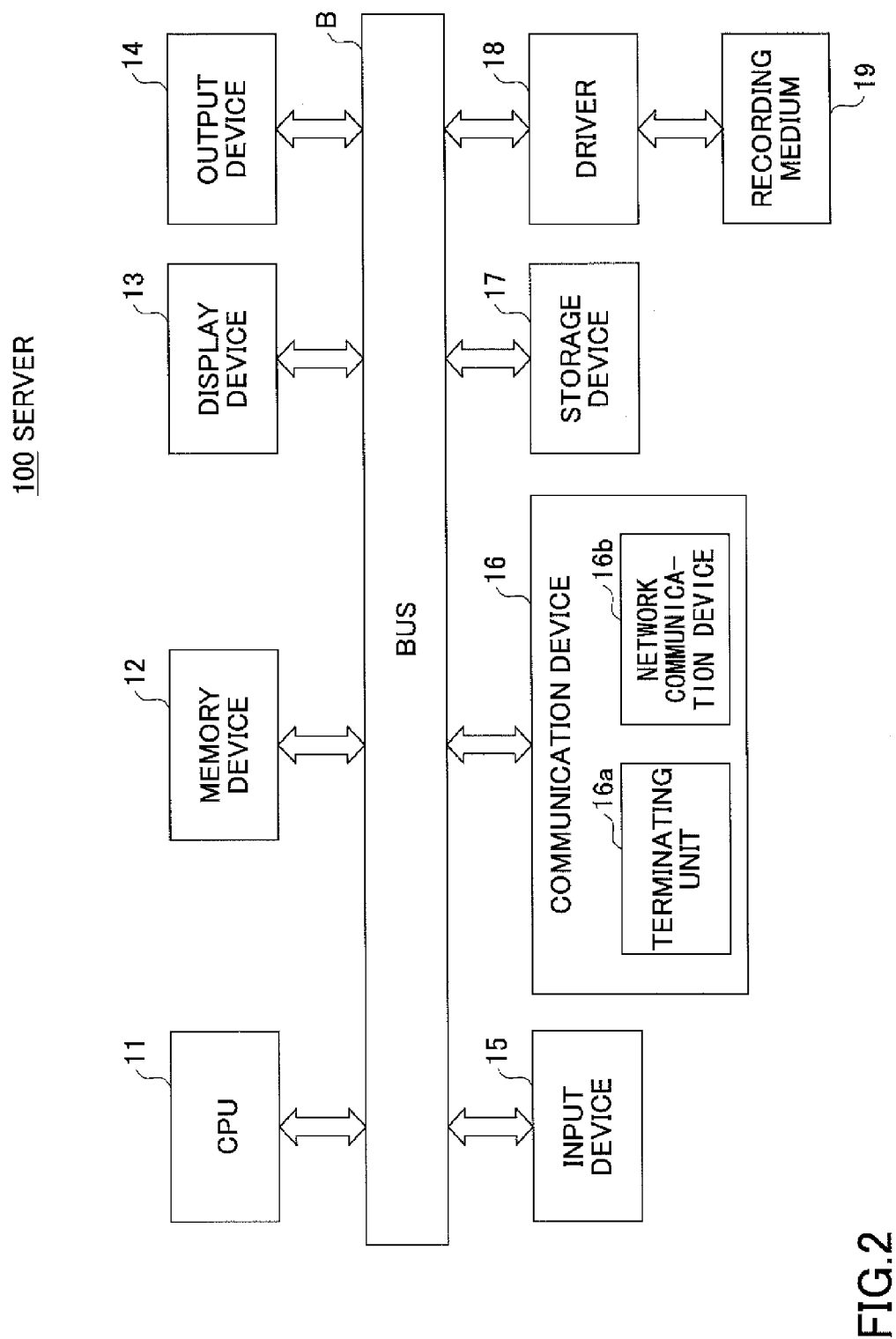
FIG. 2 is a diagram illustrating a hardware configuration of a server.

The server 100 according to the embodiment includes a hardware configuration as depicted in FIG. 2. FIG. 2 is a diagram illustrating the hardware configuration of the server 100.

In FIG. 2, the server 100 is regarded as an apparatus which is controlled by a computer, and includes a processor such as a Central Processing Unit (CPU) 11, a memory device 12, a display device 13, an output device 14, an input device 15, a communication device 16, a storage device 17, and a driver 18, which are mutually connected through a bus B.

The CPU 11 controls the server 100 in accordance with a program stored in the memory device 12. The memory device 12 includes a Random Access Memory (RAM), a Read-Only Memory (ROM), or the like. The memory device 12 stores the program to be executed by the CPU 11, data for a process conducted by the CPU 11, data acquired in the process, and the like. Also, a part of an area of the memory device 12 is allocated as a working area which is used in the process conducted by the CPU 11.

The display device 13 displays various information items for a control by the CPU 11. The output device 14 includes a printer, and the like, and is used to output various information items in response to an instruction from an administrator. The input device 15 includes a mouse, a keyboard, and the like, and is used for the administrator to input the various information items for the process conducted by the server 100.

The communication device 16 includes a terminating unit 16*a* and a network communication device 16*b*. The terminating unit 16*a* is regarded as a device which converts an analogue voice received from the customer terminal 9 into a digital signal. The network communication device 16*b* may connect to a Local Area Network (LAN) such as Ethernet or the like, and perform communication with the operator terminal 100. The communication device 16 controls the communication between the customer terminal 9 and the operator terminal 200 under the control by the CPU 11.

The storage device 17 includes a hard disk unit, and stores data such as programs for conducting various processes and the like. The memory device 12 and/or the storage device 17 may correspond to a storage part 30 depicted in FIG. 1.

The program realizing the process which is conducted by the server 100 may be provided to the server 100 by a recording medium 19 such as a Compact Disc Read-Only Memory (CD-ROM) or the like. The recording medium 19 may be formed by a non-transitory (or tangible) computer-readable recording medium. When the recording medium 19 storing the program is set into the driver 18, the driver 18 reads out the program from the recording medium 19, and the program being read out is installed into the storage device 17 through the bus B. When the CPU 11 is instructed to execute the program, the CPU 11 starts the process in accordance with the program installed into the storage device 17. A recording medium is not limited to the CD-ROM to store the program. The recording medium may be any computer-readable recording medium. The computer-readable recording medium may be a portable recording medium such as a Digital Versatile Disk (DVD) disk, a Universal Serial Bus (USB) memory, or the like, or a semiconductor memory such as a flash memory or the like, as well as the CD-ROM.

Figure 3:
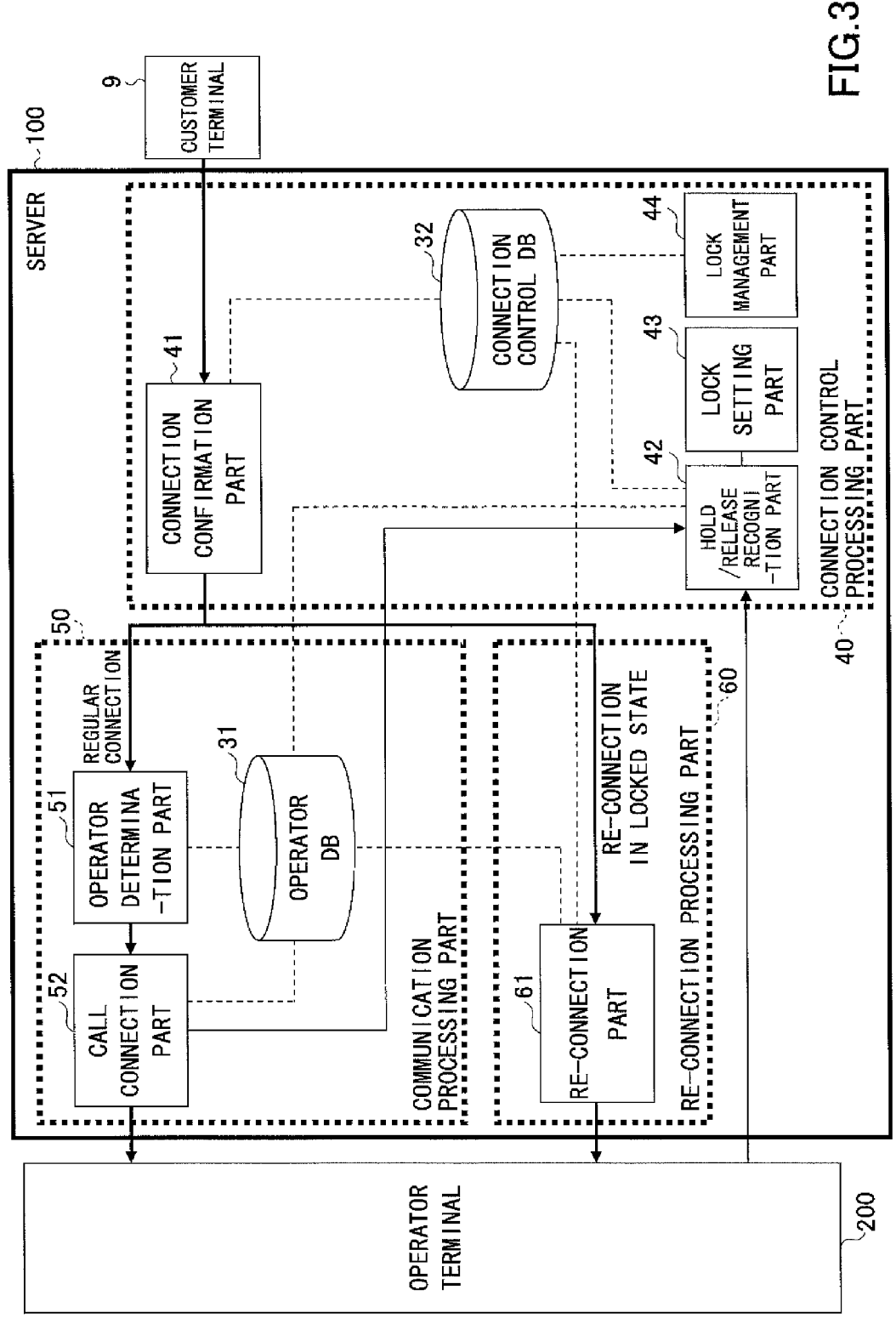
FIG. 3 is a diagram illustrating a functional configuration example of the server.

FIG. 3 is a diagram illustrating a functional configuration example of the server 100. The server 100 depicted in FIG. 3 realizes each of the connection control processing part 40, the communication processing part 50, and the re-connection processing part 60 by the CPU 11 executing corresponding programs.

The connection control processing part 40 is regarded as a control part which controls the communication processing part 50 or the re-connection processing part 60 to conduct processes pertinent to the connection or the disconnection from the customer terminal 9 through the terminating unit 16*a* by referring to the connection control DB 32.

In a case of the regular connection, the connection control processing part 40 controls the communication processing part 50 to conduct a corresponding process. On the other hand, in a case of disconnecting the communication, the connection control processing part 40 conducts a process for locking the line of the operator terminal 200 in response to a selection of the operator for receiving a call while retaining the hold state (hereinafter, called "receive-on-hold") or for reporting by a call sound. When the connection control processing part 40 recognizes the re-connection from the same customer terminal 9, the connection control processing part 40 conducts a re-connection process in which the hold state is retained.

The connection control processing part 40 includes a connection confirmation part 41, a hold/release recognition part 42, a lock setting part 43, and a lock management part 44.

The connection confirmation part 41 is regarded as a processing part which checks whether the connection request is for the regular connection or the re-connection in the hold state, by referring to the connection control DB 32 stored in the storage part 30.

The hold/release recognition part 42 is regarded as a processing part which recognizes the hold state of the line, a hold release, or the disconnection and updates the operator DB 31 and the connection control DB 32. In response to an operation for holding the line or releasing the hold state by the operator from the operator terminal 200, the hold/release recognition part 42 updates the operator DB 31 and the connection control DB 32. Also, if the disconnection of the line is acknowledged, the hold/release recognition part 42 conducts a disconnection process corresponding to a connection state in which the communication ends or the disconnection is caused while in the hold state.

The lock setting part 43 is regarded as a processing part which updates the operator DB 31 and the connection control DB 32 so as to lock the connection state of the operator terminal 200, in response to the selection of the operator for an occasion of the disconnection of the line during the hold state. When the disconnection during the hold state is recognized by the hold/release recognition part 42, the lock setting part 43 displays a screen to select one of the receive-on-hold and the call sound options with respect to the re-connection from the same customer terminal 9, and urges the operator to select one of these options.

Figure 16:
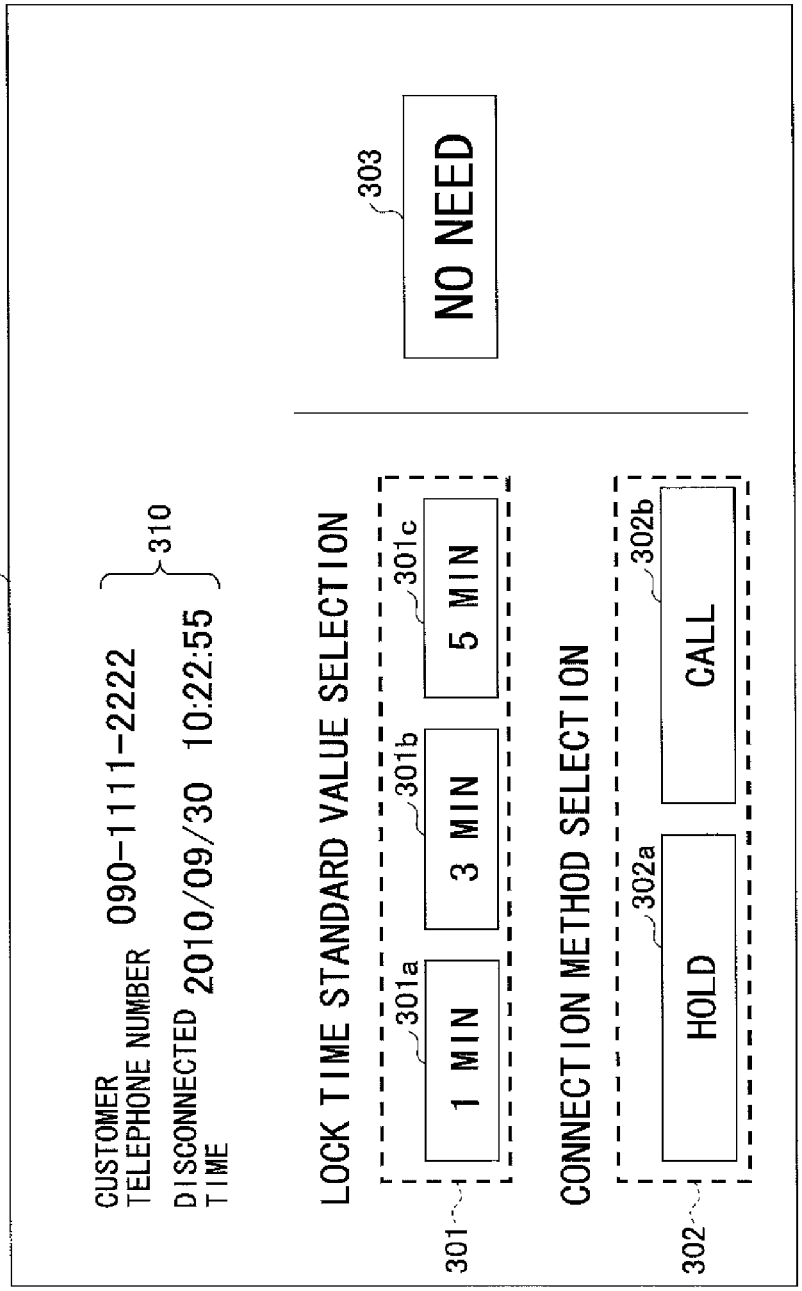
FIG. 16 is a diagram illustrating an example of a re-connection condition setting screen displayed at the operator terminal.

In the embodiment, a re-connection condition setting screen 300 as illustrated in FIG. 16 is displayed at the operator 200 in response to a recognition of the disconnection of the line during the hold state as a trigger. The re-connection condition setting screen 300 includes a lock time standard selection 301, a connection method selection 302, a "NO NEED" button 303, and a connection information display 310.

The lock time standard selection 301 may include a "1 MIN" button 301*a*, a "3 MIN" button 301*b*, and a "5 MIN" button 301*c* to select a lock time standard value for retaining the lock state in which the connection requests are not accepted from the customer terminals 9 other then the same customer terminal 9 which disconnected during the hold state.

The connection method selection 302 includes a "HOLD" button 302*a*, and "CALL" 302*b*. The "HOLD" button 302*a* is a button used to select a connection-on-hold as the connection method not to make the call sound and to retain the hold state. The "CALL" button 302*b* is a button used to select calling as the connection method to call during the hold state similar to the regular connection, in response to the re-connection from the same customer terminal 9 which disconnected during the hold state.

The "NO NEED" button 303 is selected when the line is unintentionally disconnected in the hold state but the line of the operator terminal 200 is not locked. When the "NO NEED" button 303 is selected, the line of the operator terminal 200 is released.

At the connection information display 310, a customer telephone number, and time (disconnected time) when the line is disconnected in the hold state are displayed. "CUS- TOMER TELEPHONE NUMBER 090-1111-2222" and "DISCONNECTED TIME 2010/09/30 10:22:55" are displayed. It is possible for the operator to refer to the disconnected time even if the line is disconnected while the operator is not at his/her desk.

By the re-connection condition setting screen 300, it is possible for the operator to select the lock time standard value, and to select either retaining the hold state after the disconnection or calling similar to the regular connection. That is, it is possible for the operator to select a method how to respond to the customer with respect to the re-connection from the same customer terminal 9. A connection condition indicating the lock standard value and the connection method, which are selected by the operator, is maintained for each of the operator terminals 200 by the connection control DB 32 in the storage part 30.

The lock management part 44 is regarded as a processing part which maintains a passage of a lock time managed by the connection control DB 32. The lock time indicates a time to exclude the connection with another customer terminal 9 for the operator terminal 200 which corresponds to a customer terminal 9 in a case of a line disconnection by the customer terminal 9 in the hold state.

When receiving a disconnection notice from the communication processing part 50, the hold/release recognition part 42 updates the connection control DB 32 in response to a disconnection state in which the operator disconnects or the customer disconnects. In the embodiment, if the customer disconnects after the connection is held, the lock time for locking from a current time is set to the connection control DB 32 based on the lock time standard value. By setting the lock time to the connection control DB 32, for a case of the re-connection by the same customer terminal 9, the connection to the operator terminal 200 who holds the communication is controlled not to be initiated in response to the connection request from another customer terminal 9.

The communication processing part 50 is regarded as a processing part which determines the operator terminal 200 available to connect to the customer terminal 9 and initiates the connection process when the connection request sent from the customer terminal 9 is received from the connection confirmation part 41 of the connection control processing part 40. Also, the communication processing part 50 sends a disconnection notice to the hold/release recognition part 42 of the connection control processing part 40 when the communication between the customer terminal 9 and the operator terminal 200 is disconnected in a busy state.

The communication processing part 50 includes an operator determination part 51, and a call connection part 52. The operator determination part 51 is regarded as a processing part which refers to the operator DB 31 stored in the storage part 30 and determines the operator terminal 200 being connectable for which an available state is indicated, when the connection request of the customer terminal 9 is received from the connection confirmation part 41 of the connection control processing part 40.

The call connection part 52 is regarded as a processing part which conducts the connection process for connecting to the operator terminal 200 determined by the operator determination part 51. Also, the call connection part 52 reports the disconnection of the communication to the connection confirmation part 41 of the connection control processing part 40 when the communication between the customer terminal 9 and the operator terminal 200 is disconnected in the busy state.

The re-connection processing part 60 includes a re-connection part 61. The re-connection processing part 60 conducts a re-connection process for the operator terminal 200 which is recognized as holding the connection with the customer terminal 9 which sent the re-connection request, when the re-connection request is received in the hold state from the connection confirmation part 41 of the connection control processing part 40. The re-connection process is conducted in accordance with a connection condition which is set by the operator and is maintained in the connection control DB 32 of the storage part 30.

In a case in which the operator terminal 200 automatically receives the call in the hold state based on the connection condition, the operator of the operator terminal 200 does not need to conduct an operation to receive the connection request. On the other hand, in a case of causing the operator terminal 200 call based on the connection condition, it is possible to let the operator recognize a re-connection of the customer. Thus, the operator properly responds to the customer when the call is received.

Figure 4:
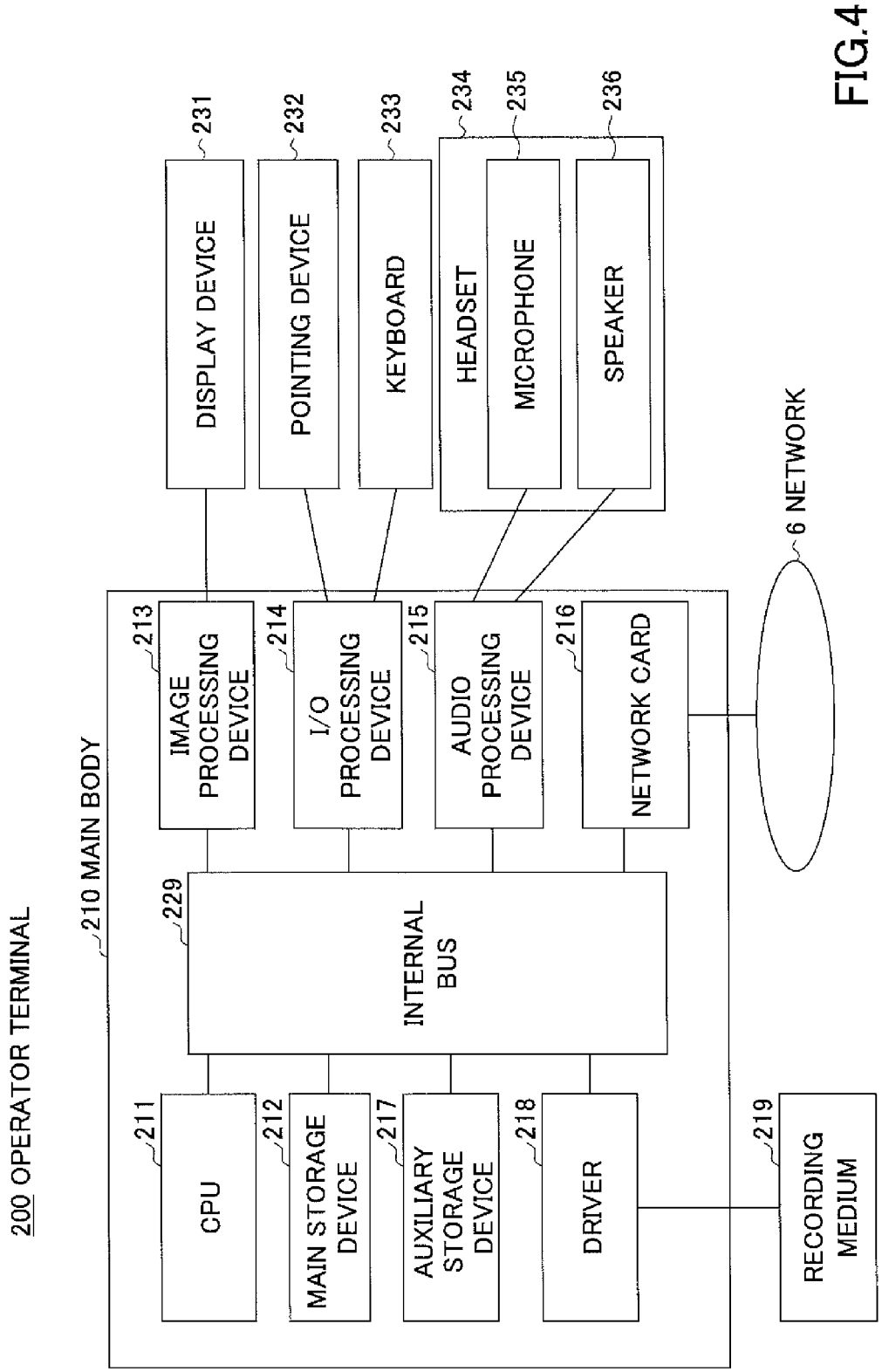
FIG. 4 is a diagram illustrating a hardware configuration of an operator terminal.

The operator terminal 200 includes a hardware configuration as depicted in FIG. 4. FIG. 4 is a diagram illustrating the hardware configuration of the operator terminal 200. In FIG. 4, the operator terminal 200 includes a processor such as a CPU 211, a main storage device 212, an image processing device 213, an input/output (I/O) processing device 214, an audio processing device 215, a network card 216, an auxiliary storage device 217, and a driver 218, which are mutually connected by an internal bus 229, in a main body 210.

Also, the operator terminal 200 includes a display device 231, a pointing device 232, a keyboard 233, and a headset 234 as peripheral devices.

The CPU 211 controls the operator terminal 200 in accordance with the program stored in the main storage device 212. The main storage device 212 includes a Random Access Memory (RAM), a Read-Only Memory (ROM), or the like, and stores programs executed by the CPU 211, data for processes conducted by the CPU 211, data acquired in the processes conducted by the CPU 211, and the like. A part of an area of the main storage device 212 is allocated as a working area which is used in the process conducted by the CPU 211.

The display device 231 is connected to the image processing device 213, and instructs the image processing device 213 to display various information items under a control of the CPU 211. The pointing device 232 such as a mouse and the keyboard 233 are connected to the I/O processing device 214. The I/O processing device 214 controls respective inputs of the information items for a process pertinent to the communication between the operator and the customer.

The headset 234 is connected to the audio processing device 215. The audio processing device 215 conducts an audio process for the operator to communicate with the customer. The headset 234 includes a microphone 235 for conversation with the customer, and a speaker 236 for outputting a customer voice. The network card 216 is connected to the network 6 and controls a network communication with the server 100.

The program realizing the process which is conducted by the operator terminal 200 may be provided to the operator terminal 200 by a recording medium 219 such as a Compact Disc Read-Only Memory (CD-ROM) or the like. The recording medium 219 may be formed by a non-transitory (or tangible) computer-readable recording medium. When the recording medium 219 storing the program is set into the driver 218, the driver 218 reads out the program from the recording medium 219, and the program being read out is installed into the auxiliary storage device 217 through the internal bus 229. When the CPU 211 is instructed to execute the program, the CPU 211 starts the process in accordance with the program installed into the auxiliary storage device 217. A recording medium is not limited to the CD-ROM to store the program. The recording medium 219 may be any computer-readable recording medium. As the computer-readable recording medium, a portable recording medium such as a Digital Versatile Disk (DVD) disk, a Universal Serial Bus (USB) memory, or the like, or a semiconductor memory such as a flash memory or the like, as well as the CD-ROM.

Figure 5:
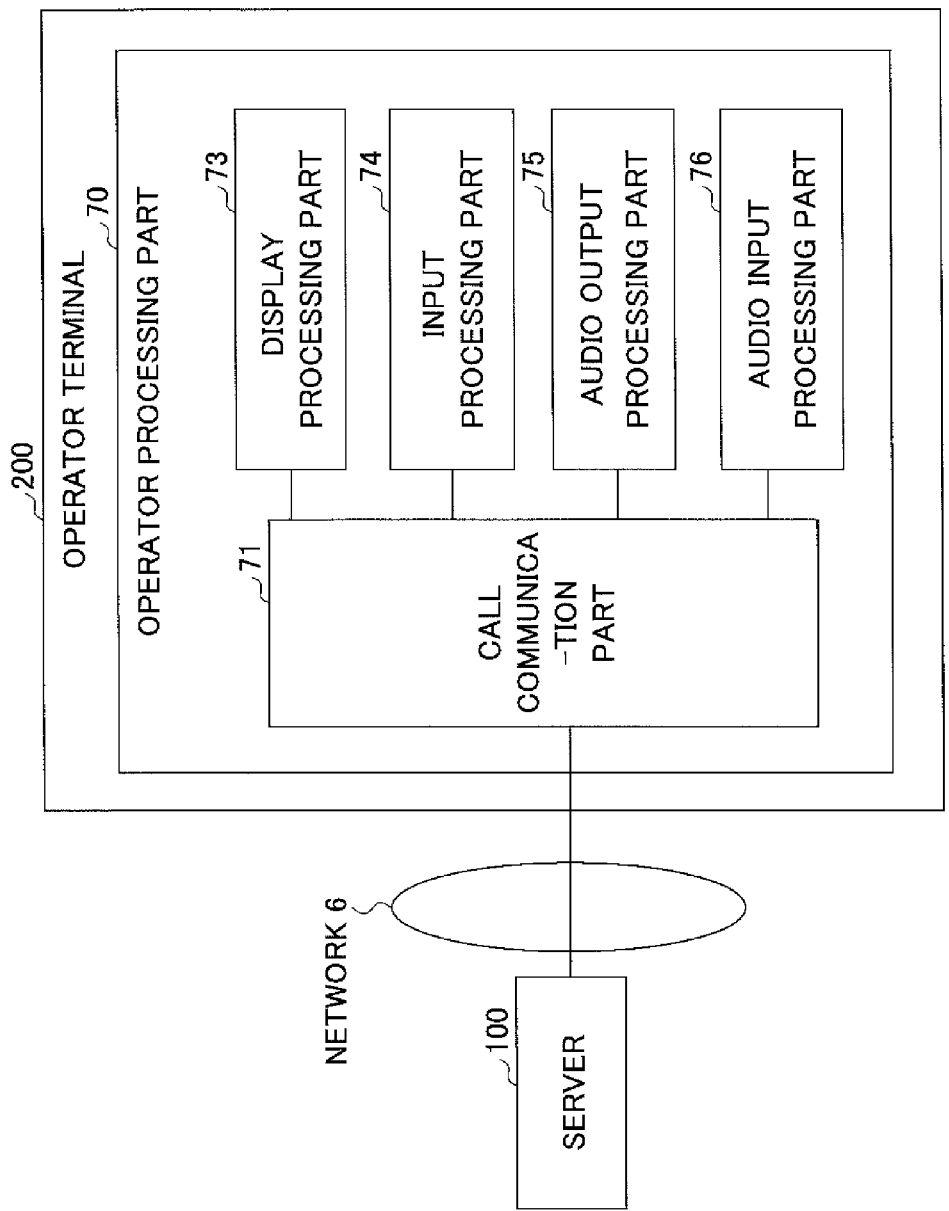
FIG. 5 is a diagram illustrating a functional configuration example of the operator terminal.

FIG. 5 is a diagram illustrating a functional configuration example of the operator terminal 200. The operator terminal 200 illustrated in FIG. 5 includes an operator processing part 70 which is realized by the CPU 211 executing a corresponding program. The operator processing part 70 further includes a call communication part 71, a display processing part 73, an input processing part 74, an audio output processing part 75, and an audio input processing part 76.

The call communication part 71 receives the call from the customer terminal 9 through the server 100 by the connection process conducted by the server 100 to connect to the customer terminal 9, so that the communication becomes available between the operator and the customer. Also, the call communication part 71 controls transmission of packets. In a case of data packets, the call communication part 71 controls the display processing part 73 and the input processing part 74. In a case of audio packets, the call communication part 71 controls the audio output processing part 75 and the audio input processing part 76.

The display processing part 73 controls displaying data at the display device 231 through the image processing device 213. The input processing part 74 processes data input from the pointing device 232 or the keyboard 233 through the I/O processing device 214.

The audio output processing part 75 instructs the audio processing device 215 to process the audio packets of the customer received through the server 100 and to output the voice of the customer from the speaker 236. The audio input processing part 76 creates the audio packets of the voice of the operator input to the microphone 235 and sends the audio packets to the server 100.

Figure 6:
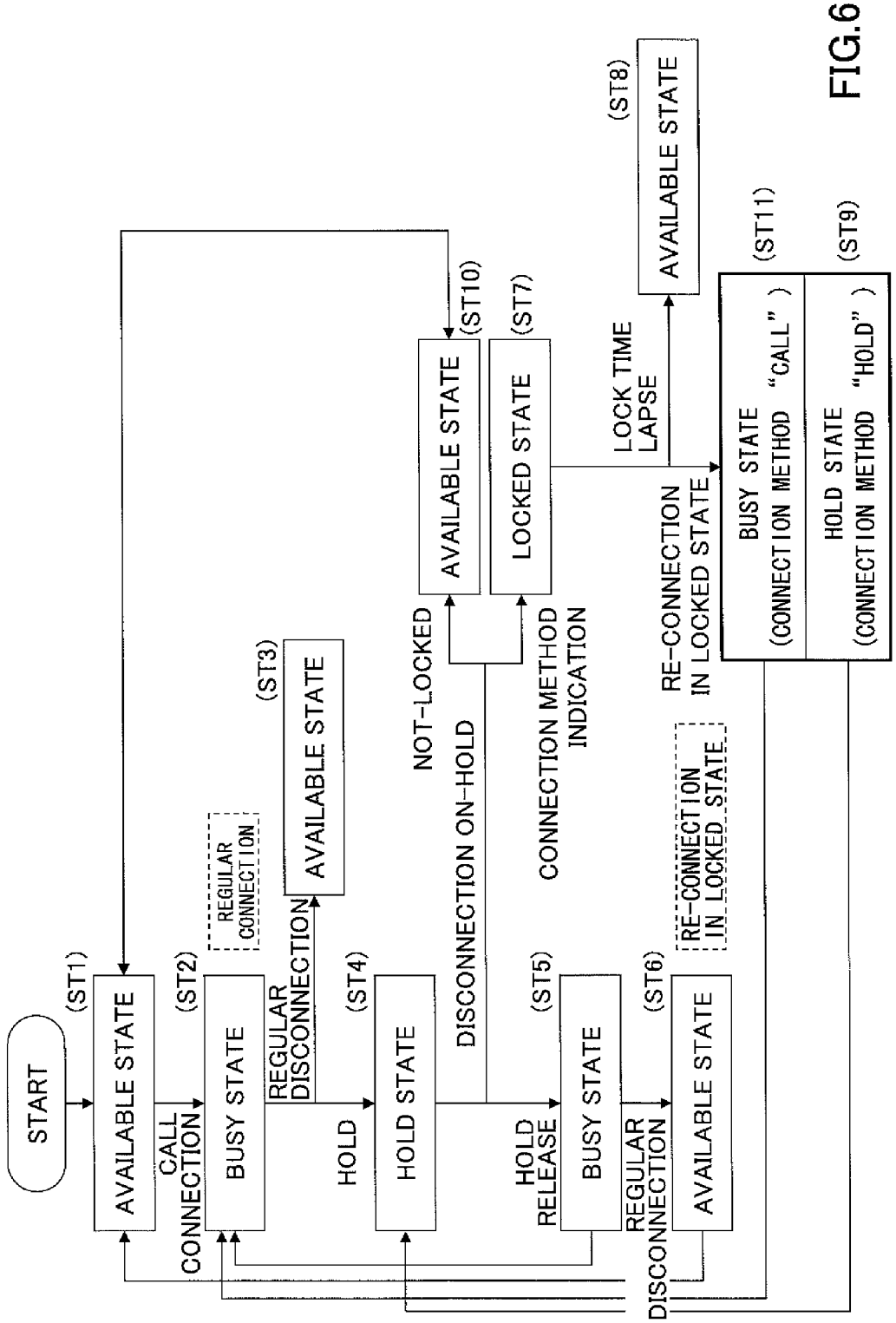
FIG. 6 is a diagram for explaining a state transition of the operator terminal.

FIG. 6 is a diagram for explaining a state transition of the operator terminal 200. In FIG. 6, a state number is applied to each of the states, and the state numbers are indicated at corresponding portions in flowcharts described below.

In FIG. 6, the state of the operator terminal 200 maintained by the server 100 is started from an available state (ST1) in which a connection to the line of the operator terminal 200 is available. In the available state (ST1), when the call (the connection request) is received from the customer terminal 9 and the connection is established between the operator terminal 200 and the customer terminal 9 (the regular connection), the operator terminal 200 is transitioned from the available state (ST1) to a busy state (ST2).

In the busy state (ST2), when the communication ends and a regular disconnection of the line is conducted between the operator and the customer, the operator terminal 200 is transitioned from the busy state (ST2) to an available state (ST3).

On the other hand, in the busy state (ST2), when the operator holds the communication to respond to an inquiry of the customer, the operator terminal 200 transitions from the busy state (ST2) to the hold state (ST4).

In the hold state (ST4), when the operator releases the hold to answer the inquiry of the customer, the operator terminal 200 transitions from the hold state (ST4) to a busy state (ST5) (that is, to the busy state (ST2)).

In the busy state (ST5), when the communication ends and the regular disconnection of the like is conducted between the operator and the customer, the operator terminal 200 transitions from the busy state (ST5) to an available state (ST6) (that is, the available state (ST1)).

On the other hand, in the hold state (ST4), when the line is disconnect by the customer terminal 9 (a disconnection-on-hold), the re-connection condition setting screen 300 depicted in FIG. 16 is displayed at the operator terminal 200. The state of the operator terminal 200 transitions in response to selections of the operator at the re-connection condition setting screen 300.

In a case in which the line is unintentionally disconnected by the customer during the hold state (ST4), when the operator selects not to lock by clicking the "NO NEED" button 303 at the re-connection condition setting screen 300, the operator terminal 200 is transitioned from the hold state (ST4) to an available state (ST10) (that is, the available state (ST1)).

On the other hand, when the operator selects the lock time standard value from the lock time standard value selection 301 at the re-connection condition setting screen 300, and selects the connection method from the connection method selection 302, the line of the operator terminal 200 is locked while retaining the hold state (ST4). The operator terminal 200 is transitioned from the hold state (ST4) to a locked state (ST7).

In the locked state (ST7), when the lock time lapses, the operator terminal 200 is transitioned from the locked state (ST7) to an available state (ST8) (that is, the available state (ST1)).

On the other hand, in the locked state (ST7), in a case of receiving the re-connection request from the same customer terminal 9, if "HOLD" (the connection-on-hold) is set by the operator as the connection method, the operator terminal 200 is transitioned from the locked state (ST7) to a hold state (ST9) (that is, the hold state (ST4)). On the other hand, when "CALL" (the regular connection) is set by the operator as the connection method, the operator terminal 200 is transitioned from the locked state (ST7) to a busy state (ST11) (that is, the busy state (ST2)).

Data configuration examples for maintaining the connection state in response to the above described state transition of the operator terminal 200 will be described with reference to FIG. 7A and FIG. 7B.

FIG. 7A is a diagram illustrating a data configuration example of the operator DB 31. In FIG. 7A, the operator DB 31 includes items of an operator ID, a connection state, and the like. The operator ID corresponds to identification information used to identify the operator and substantially specify the operator terminal 200. A value corresponding to the state of the operator terminal 200 depicted in FIG. 6 is set to the connection state. That is, one of values indicating "BUSY", "HOLD", "LOCKED", and "AVAILABLE" is set to the connection state.

"BUSY" indicates a state in which the operator communicates with the customer, that is, in which the operator terminal 200 is in the busy state (ST2 or ST11) depicted in FIG. 6.

"HOLD" indicates a state in which the operator holds the call, that is, in which the operator terminal 200 is in the hold state (ST4 or ST9) depicted in FIG. 6.

"LOCKED" indicates a state in which any connection from another customer has been excluded for a predetermined time in preparation for the re-connection from the same customer terminal 9 when the communication is disconnected from the customer in the hold state (ST4), that is, in which the operator terminal 200 is in the locked state (ST7) depicted in FIG. 6. When the customer disconnects the telephone, the operator selects the lock time standard value. By this manner, there is no interruption by a new call from another customer. It is possible for the operator to be focused on the work.

"AVAILABLE" indicates a state in which the operator terminal 200 is available to be connected, that is, in which the operator terminal 200 is in the available state (ST1, ST8, or ST10) depicted in FIG. 6.

In a data example of the operator DB 31 depicted in FIG. 7A, the connection state of an operator ID "OP11111" indicates "LOCKED", the connection state of an operator ID "OP22222" indicates "AVAILABLE", the connection state of an operator ID "OP33333" indicates "BUSY", and the connection state of an operator ID "OP44444" indicates "HOLD". Moreover, the connection state of the operator ID "OP55555" indicates "LOCKED".

FIG. 7B is a diagram illustrating a data configuration example of the connection control DB 32. In FIG. 7B, the connection control DB 32 includes items of an operator ID, a customer telephone number, a connection method, a lock time standard time, a lock time, and the like. The operator ID indicates the identification information for identifying the operator and is used to substantially specify the operator terminal 200. The customer telephone number indicates a telephone number of the customer terminal 9. A connection condition 32a is indicated by the connection method and the lock time standard value.

The connection method indicates a connection method, which is selected by the operator at the connection method selection 302 at the re-connection condition setting screen 300 as depicted in FIG. 16. When the operator selects the "HOLD" button 302a, the connection method indicates the connection-on-hold. When the operator selects the "CALL" button 302b, the connection method indicates the regular connection.

The lock time standard value selected by the operator from the lock time standard value selection 301 of the re-connection condition setting screen 300 as depicted in FIG. 16 is set to the lock time standard value of the connection control DB 32. When the operator selects the "1 MIN" button 301a, the connection method indicates "1 MIN".

A time to lock is set to the lock time so that the connection with another customer terminal 9 is suppressed based on the lock time standard value when the connection state in the operator DB 31 is changed from "HOLD" to "LOCKED".

In a data example of the connection control DB 32 depicted in FIG. 7B, a record is created to correspond to the customer telephone number "090-1111-2222" for the operator ID "OP44444", when the connection state corresponding to the operator ID "OP44444" is changed to "HOLD" in the operator DB 31. At this point when the record is created, the lock time is blank, that is, the lock time indicates no value.

When the operator of the operator ID "OP44444" releases the hold, the connection state corresponding to the operator ID "OP44444" is changed to "BUSY" in the operator DB 31, and this record is deleted.

When the operator of the operator ID selects the "NO NEED" button 303 from the re-connection condition setting screen 300 as depicted in FIG. 16 which is displayed when the communication is disconnected during the hold state (ST4), the connection state corresponding to the operator ID "OP44444" in the operator DB 31 is changed to "AVAILABLE", and this record is deleted.

The record, which is created when the connection state is changed to "HOLD" and in which the customer telephone number "090-3333-4444" corresponds to the operator ID "OP11111", indicates that the lock time is set, since the call disconnection is made by the customer terminal 9.

The lock time indicates a date, and a lock start time and a lock end time in a format "yyyy/mm/dd hh:mm:ss to hh:mm:ss". A disconnection time is set to the lock start time. A value, which is acquired by adding a value "3 min" of the lock time standard value indicated by the operator to the disconnected time, is set to the lock end time.

In this example, since the lock time standard value "3 MIN" indicated by the operator is added to the disconnected time, "2010/09/30 10:20:55 TO 10:23:55" is set. From the lock start time "10:20:55" to the lock end time "10:23:55" on a date "2010/09/30", the line is controlled not to be connected from another customer to the operator ID "OP11111".

The connection state of the operator ID "OP11111" indicates "LOCKED" in the operator DB 31. During "LOCKED", in a case in which the call is received from the same telephone number "090-3333-4444", the connection state is changed from "LOCKED" to "HOLD". In addition, the blank (no value) is set to the lock time of the operator ID "OP11111" in the connection control DB 32.

On the other hand, when the lock time of the operator ID "OP11111" in the connection control DB 32 lapses, the record of the operator ID "OP11111" is deleted. Also, "AVAILABLE" is set to the connection state of the operator ID "OP11111" in the operator DB 31.

Similarly, a record, in which the operator ID "OP55555" corresponds to the customer telephone "090-5555-6666", is created when the communication is held, and the record indicates a state in which the lock time is set due to a call disconnection made by the customer terminal 9.

In this example, by adding the lock time standard value "1 MIN" indicated by the operator to the disconnected time, "2010/09/30 10:20:50 TO 10:21:50" is set to the lock time. From the lock start time "10:20:55" to the lock end time "10:23:55" on the date "2010/09/30", the line is controlled not to be connected from another customer to the operator ID "OP11111".

The connection state of the operator ID "OP11111" indicates "LOCKED" in the operator DB 31. When the call is received from the same customer telephone number "090-5555-6666" in this "LOCKED" state, the connection state is changed from "LOCKED" to "BUSY", and this record is deleted.

Figure 8:
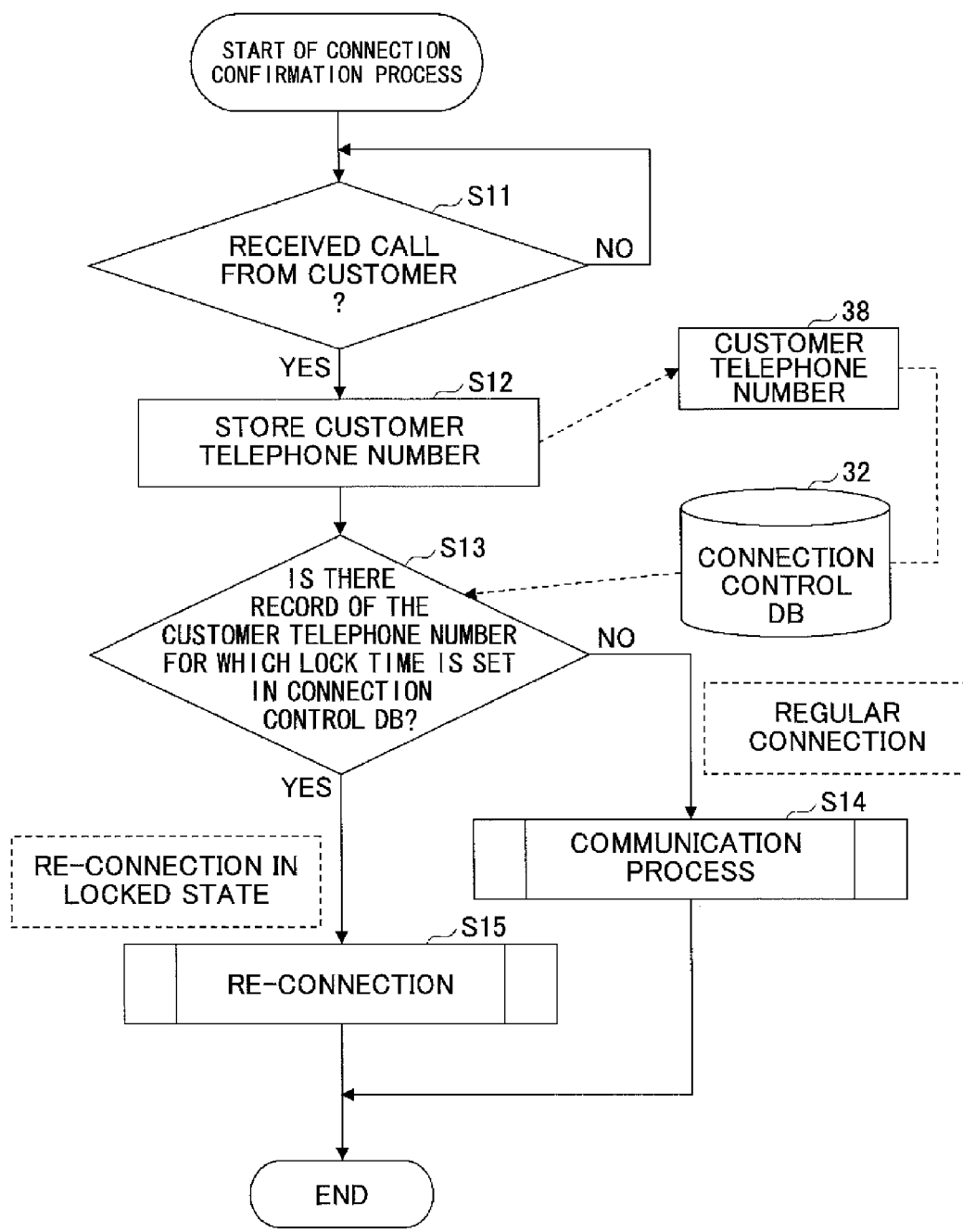
FIG. 8 is a flowchart for explaining a connection confirmation process by a connection confirmation part in the server.

Next, the connection control process of the call received from the customer in the embodiment will be described. First, a connection confirmation process, which is conducted by the connection confirmation part 41 in the connection control processing part in the server 100, will be described. FIG. 8 is a flowchart for explaining the connection confirmation process by the connection confirmation part 41 in the server 100.

In FIG. 8, the connection confirmation part 41 determines at predetermined intervals whether the call is received from the customer (step S11). The connection confirmation part 41 determines whether the connection request (the call) is received from the customer terminal 9. When the connection request is not received, the connection confirmation part 41 waits for the connection request, and repeats step S11.

On the other hand, in step S11, when the connection request is received, the connection confirmation part 41 acquires a customer telephone number 38 from the connection request, and stores the customer telephone number 38 in the storage part 30 (step S12).

After that, the connection confirmation part 41 refers to the connection control DB 32, and determines whether there is a record of the customer telephone number 38 for which the lock time is set (step S13). When there is no record of the customer telephone number 38, the connection confirmation part 41 instructs the communication processing part 50 to perform the communication process by the regular connection (step S14). When the communication process ends, the connection confirmation process ends.

After that, if it is determined that there is the record of the customer telephone number 38, the connection confirmation part 41 determines that the re-connection is received from the same customer telephone number 38 in the locked state (ST7), instructs the re-connection processing part 60 to perform the re-connection process (step S15). When this re-connection process ends, the connection confirmation process is terminated.

Figure 9:
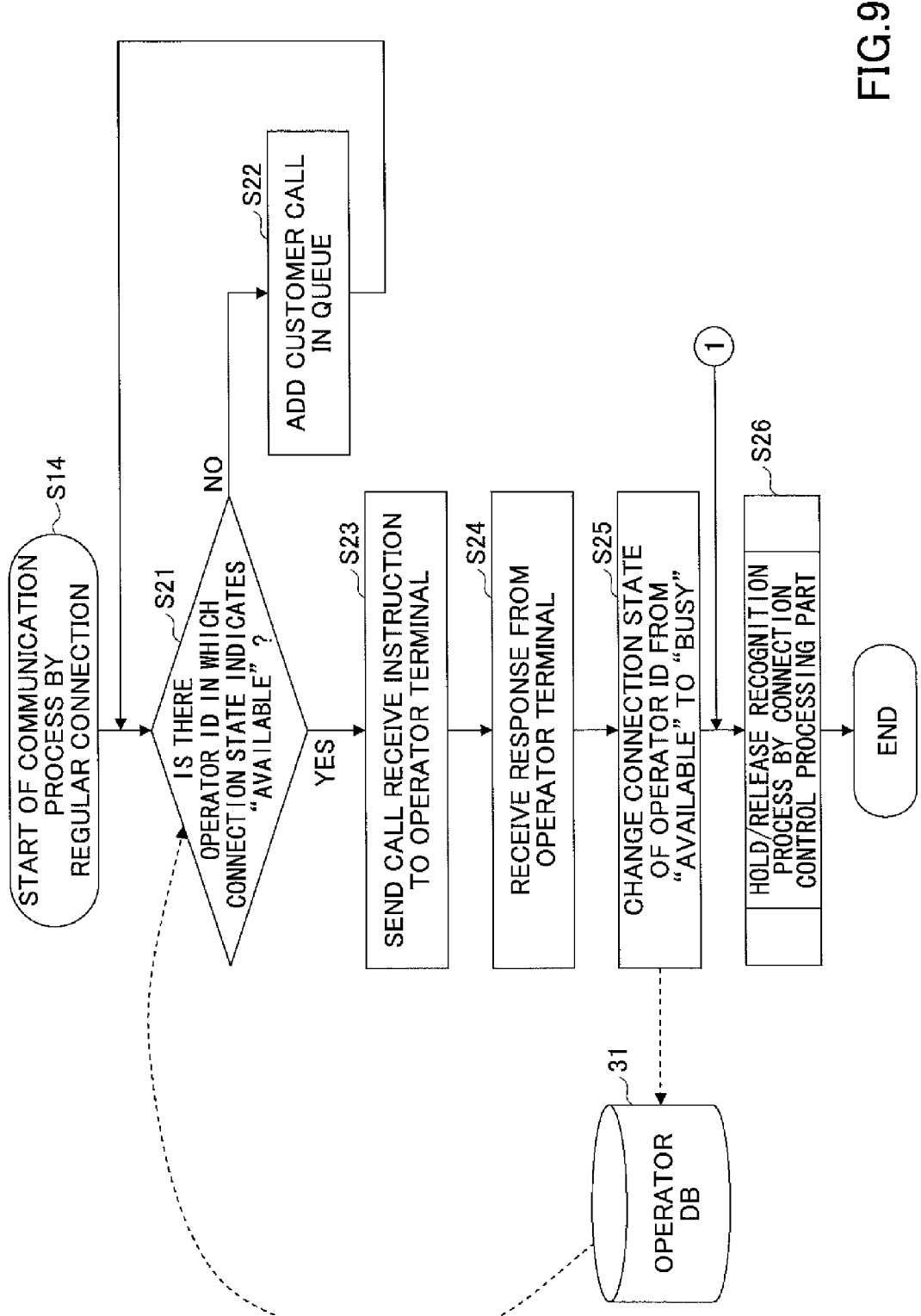
FIG. 9 is a flowchart for explaining a communication process by a regular connection in step S14 in FIG. 8.

The communication process by the regular connection, which is conducted by the communication processing part 50 in step S14 in FIG. 8, will be described with reference to FIG. 9. FIG. 9 is a flowchart for explaining the communication process by the regular connection in step S14 in FIG. 8. In FIG. 9, when the communication processing part 50 receives an instruction of the communication process from the connection confirmation part 41 of the connection control processing part 40 in response to the connection request sent from the customer terminal 9, the operator determination part 51 of the communication processing part 50 determines by referring to the operator DB 31 whether there is an operator ID for which the connection state indicates "AVAILABLE" (step S21). When there is an operator ID, the operator determination part 51 adds the call of the customer to a waiting queue (step S22), and goes back to step S21 to repeat the above described processes until the operator ID in which the connection state indicates "AVAILABLE" is acquired.

On the other hand, in step S21, when there is an operator ID, the operator determination part 51 reports the operator ID acquired from the operator DB 31 to the call connection part 52. The call connection part 52 sends a call receive instruction to the operator terminal 200 corresponding to the operator ID reported from the operator determination part 51 (step S23).

When the call connection part 52 receives a response from the operator terminal 200 in response to the call receive instruction (step S24), the call connection part 52 changes the connection state of the acquired operator ID in the operator DB 31 from "AVAILABLE" to "BUSY" (step S25).

The communication processing part 50 instructs the hold/release recognition part 42 of the connection control processing part 40 to perform a process corresponding to a change of the connection state (step S26), and terminates the connection confirmation process.

Figure 10:
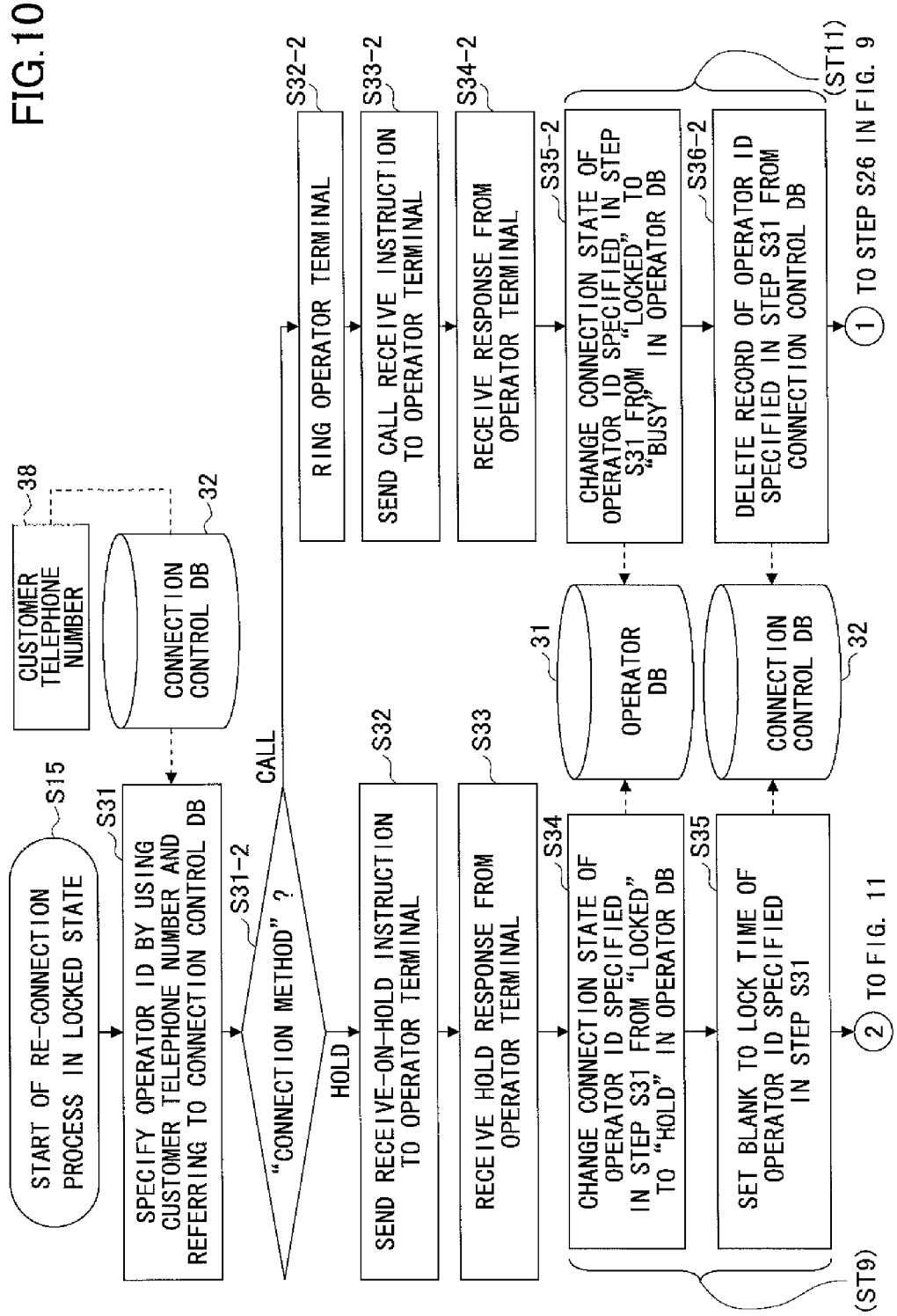
FIG. 10 is a flowchart for explaining a re-connection process in a hold state in step S15 in FIG. 8.

The re-connection process in the locked state (ST7), which is conducted by the communication processing part 50 in step S15 in FIG. 8, will be described with reference to FIG. 10. FIG. 10 is a flowchart for explaining the re-connection process in step S15 in FIG. 8 while the call has been held. In FIG. 10, when an instruction of the re-connection process with respect to the connection request sent from the customer terminal 9 is received from the connection confirmation part 41 of the connection control processing part 40 in the locked state (ST7), the re-connection part 61 of the re-connection processing part 60 refers to the connection control DB 32 by using the customer telephone number 38 stored in the storage part 30, and specifies the operator ID (step S31).

The re-connection part 61 determines whether the connection method of the operator ID, which is specified, in the connection DB 32 indicates the connection-on-hold (step S31-2).

When the connection method indicates the connection-on-hold, the re-connection part 61 sends a receive-on-hold instruction for receiving the call while being on hold, to the operator terminal 200 (step S32), and receives a hold response from the operator terminal 200 (step S33).

When the hold response is received from the operator terminal 200, the re-connection part 61 changes the connection state of the operator ID specified in step S31 from "LOCKED" to "HOLD" in the operator DB 31 (step S34).

Also, the re-connection part 61 sets the lock time of the operator ID specified in step S31 to blank in the connection control DB 32 (step S35). After that, the re-connection part 61 terminates the re-connection process. Then, a process (FIG. 11 and FIG. 12), which corresponds to a change of the connection state after the communication is held, is conducted in a hold/release recognition process performed by the hold/release recognition part 42 of the connection control processing part 40.

On the other hand, it is determined that the connection method indicates the regular connection in step S31-2, the re-connection part 61 produces the call sound of the operator terminal 200 (step S32-2). The re-connection part 61 sends a call receive instruction to the operator terminal 200 (step S33-2), and receives a response from the operator terminal 200 (step S34-2).

After receiving the response from the operator terminal 200, the re-connection part 61 changes the connection state of the operator ID specified in step S31 from "LOCKED" to "BUSY" (step S35-2).

Furthermore, the re-connection part 61 deletes the record of the operator ID specified in step S31 from the connection control DB 32 (step S36-2). After that, the re-connection process by the re-connection part 61 ends, the communication processing part 50 resumes the communication process from step S26 (FIG. 9), and conducts a process corresponding to the connection state after the line becomes busy.

Figure 11:
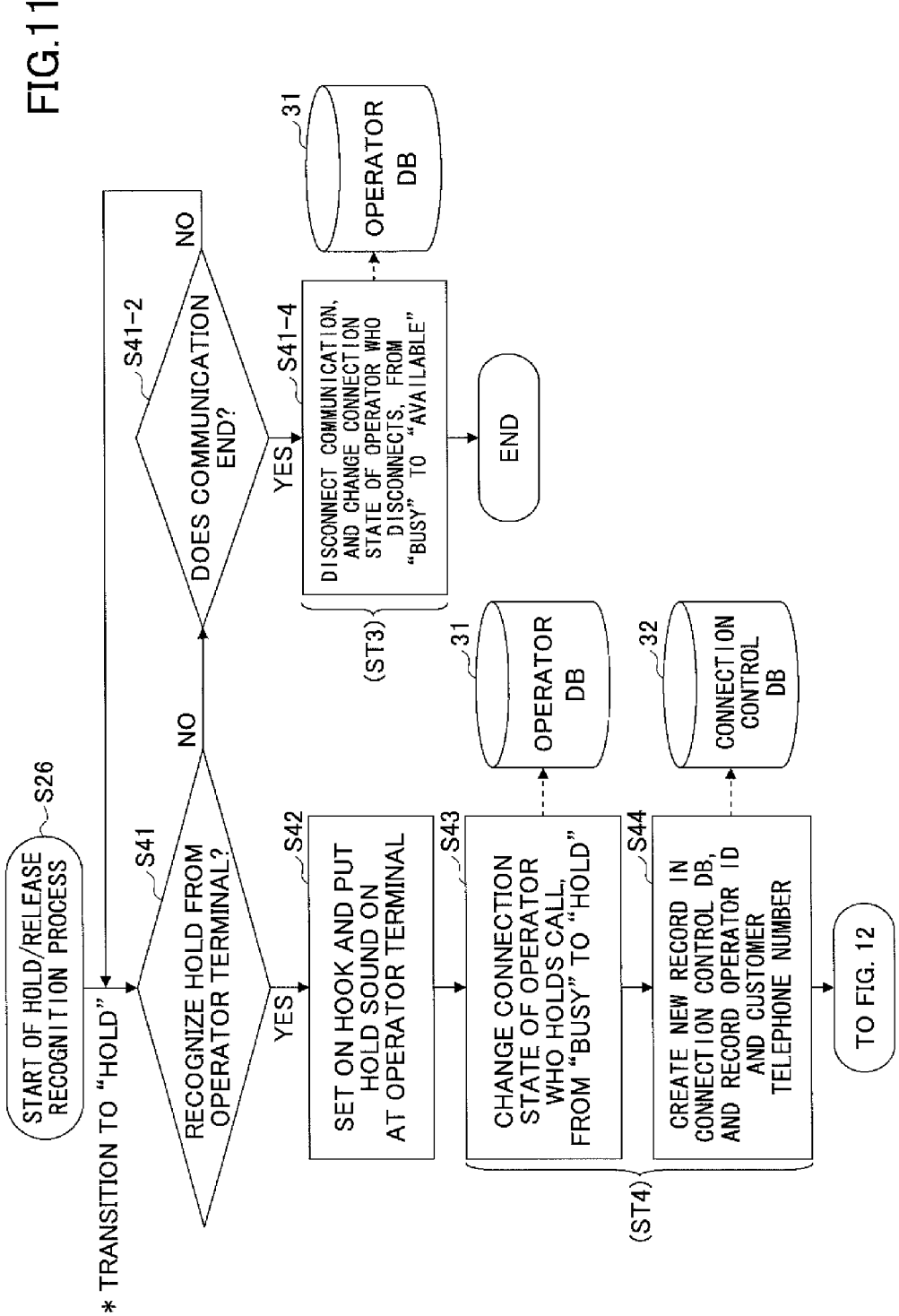
FIG. 11 is a flowchart for explaining a hold/release recognition process conducted by a hold/release recognition part of a connection control processing part (part 1)
Figure 12:
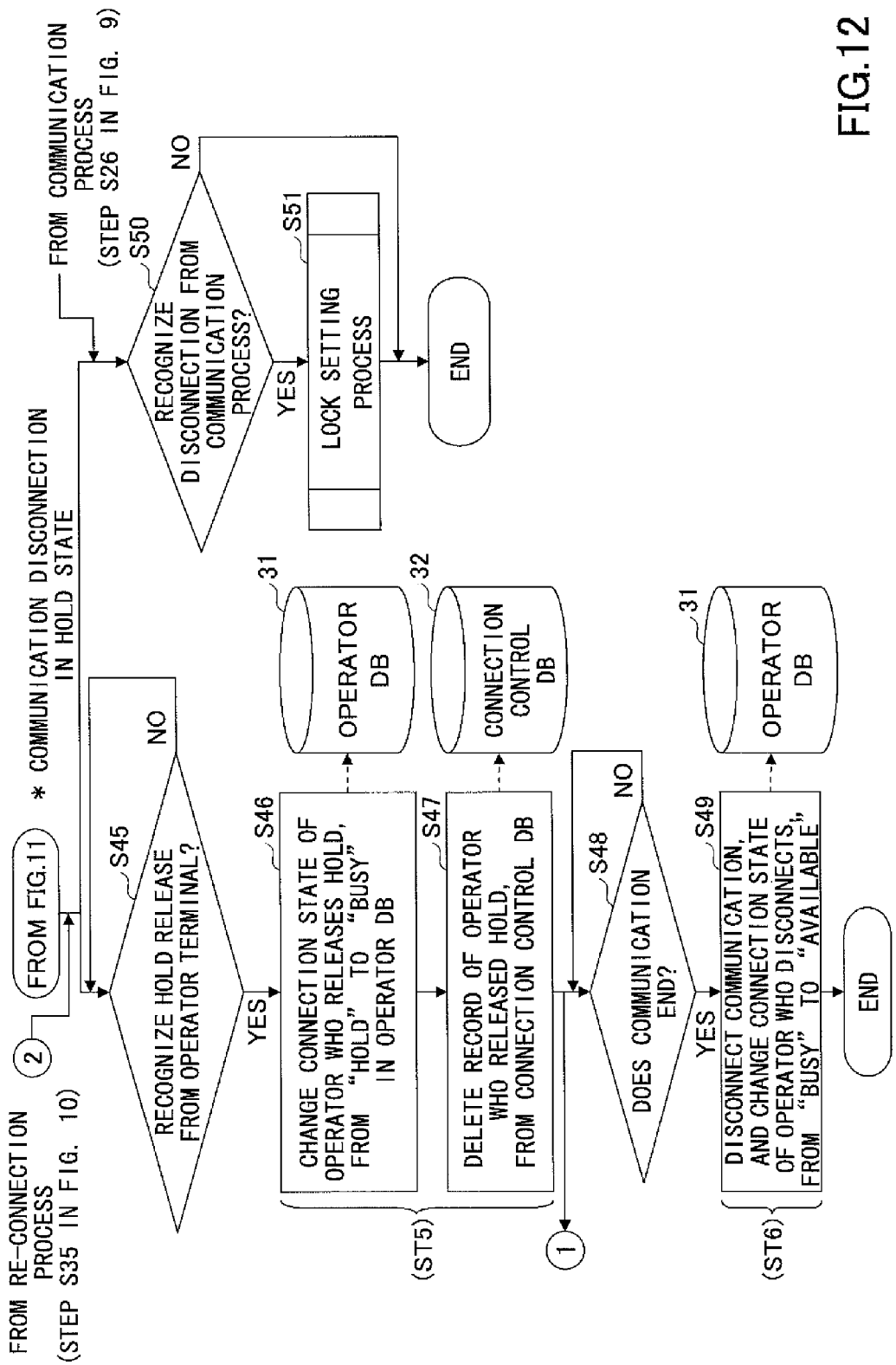
FIG. 12 is a flowchart for explaining the hold/release recognition process conducted by the hold/release recognition part of the connection control processing part (part 2)

Next, the hold/release recognition process by the hold/release recognition part 42 of the connection control processing part 40 will be described with reference to FIG. 11 and FIG. 12. FIG. 11 and FIG. 12 are flowcharts for explaining the hold/release recognition process of the connection control processing part. In FIG. 11 and FIG. 12, the hold/release recognition part 42 of the connection control processing part 40 conducts one of the hold process, the hold release process, and the disconnection process.

The hold/release recognition part 42 determines whether the hold from the operator terminal 200 is recognized by an event report (step S41).

When the operator selects a hold button displayed at a display device 231 of the operator terminal 200 by the pointing device 232, the event report indicating the hold is sent to the hold/release recognition part 42. Also, when the operator selects a disconnection button displayed at the display device 231 of the operator terminal 200 by using the pointing device 232, the event report indicating the disconnection due to a communication end is sent to the hold/release recognition part 42.

In step S41, when the hold is not recognized, the hold/release recognition part 42 determines, in response to the event report, whether the disconnection is made by the operator terminal 200 due to the communication end (step S41-2). When the disconnection is not made due to the communication end, the hold/release recognition part 42 goes back to step S41 and repeats the above described process.

On the other hand, when it is determined, in step S41-2, that the disconnection is made due to the communication end, the hold/release recognition part 42 disconnects the communication, acquires the operator ID of the operator who disconnects, from the event report, and changes the connection state of the operator ID from "BUSY" to "AVAILABLE" in the operator DB 31 (step S41-4). After that, the hold/release recognition part 42 terminates the hold/release recognition process.

On the other hand, it is determined, in step S41, that the hold is recognized, the hold/release recognition part 42 sets on-hook at the operator terminal 200, and lets the operator terminal 200 output the hold sound (step S42). The hold sound is being sent to the customer terminal 9. Meanwhile, voice from the customer terminal 9 is being sent to the operator terminal 200. Accordingly, it is possible for the operator to know a circumstance of the customer at the customer terminal 9 during the hold state.

After that, the hold/release recognition part 42 changes the connection state of the operator who held the communication, from "BUSY" to "HOLD" in the operator DB 31 by using the operator ID indicated by the event report (step S43).

Also, the hold/release recognition part 42 creates a new record in the connection control DB 32, and records the operator ID and the customer telephone number (step S44). In the data example of the connection control DB 32 depicted in FIG. 7B, a record of the operator ID "OP44444" is newly created.

The hold/release recognition part 42 determines whether the hold release is recognized by the event report (step S45). When the hold release is not recognized, a determination is similarly conducted for a next event report. On the other hand, when the hold release is recognized, the hold/release recognition part 42 changes the connection state of the operator who released the hold from "HOLD" to "BUSY" by using the operator ID indicated by the event report (step S46).

Also, the hold/release recognition part 42 deletes the record of the operator who released the hold, from the connection control DB 32 (step S47). In the data example of the connection control DB 32 depicted in FIG. 7B, when the record for the operator of the operator ID "OP44444" who releases the hold is deleted.

The hold/release recognition part 42 determines, in response to the event report, whether the disconnection is made due to the end of communication (step S48). When the disconnection is made due to the end of communication, a determination is similarly conducted for the next event report. On the other hand, when the disconnection is made due to the end of communication, the hold/release recognition part 42 disconnects the communication, acquires the operator ID of the operator who disconnect from the event report, and changes the connection state of the operator ID of the operator DB 31 from "BUSY" to "AVAILABLE" (step S49). After that, the hold/release recognition process is terminated.

Also, the hold/release recognition part 42 determines, in response to the event report from the communication processing part 50, whether the disconnection is recognized (step S50). When the disconnection is not recognized, the hold/release recognition part 42 terminates the hold/release recognition process. On the other hand, the hold/release recognition part 42 instructs the lock setting part 43 to conduct the lock setting process (step S51), and terminates the hold/release recognition process.

In the above described hold/release recognition process, steps S43 and S44 correspond to the hold state (ST47) in FIG. 6, and step S41-3 corresponds to the available state (ST3) in FIG. 6. Also, steps S46 and S47 correspond to the busy state (ST5), and step S49 corresponds to the available state (ST6) in FIG. 6.

Figure 13:
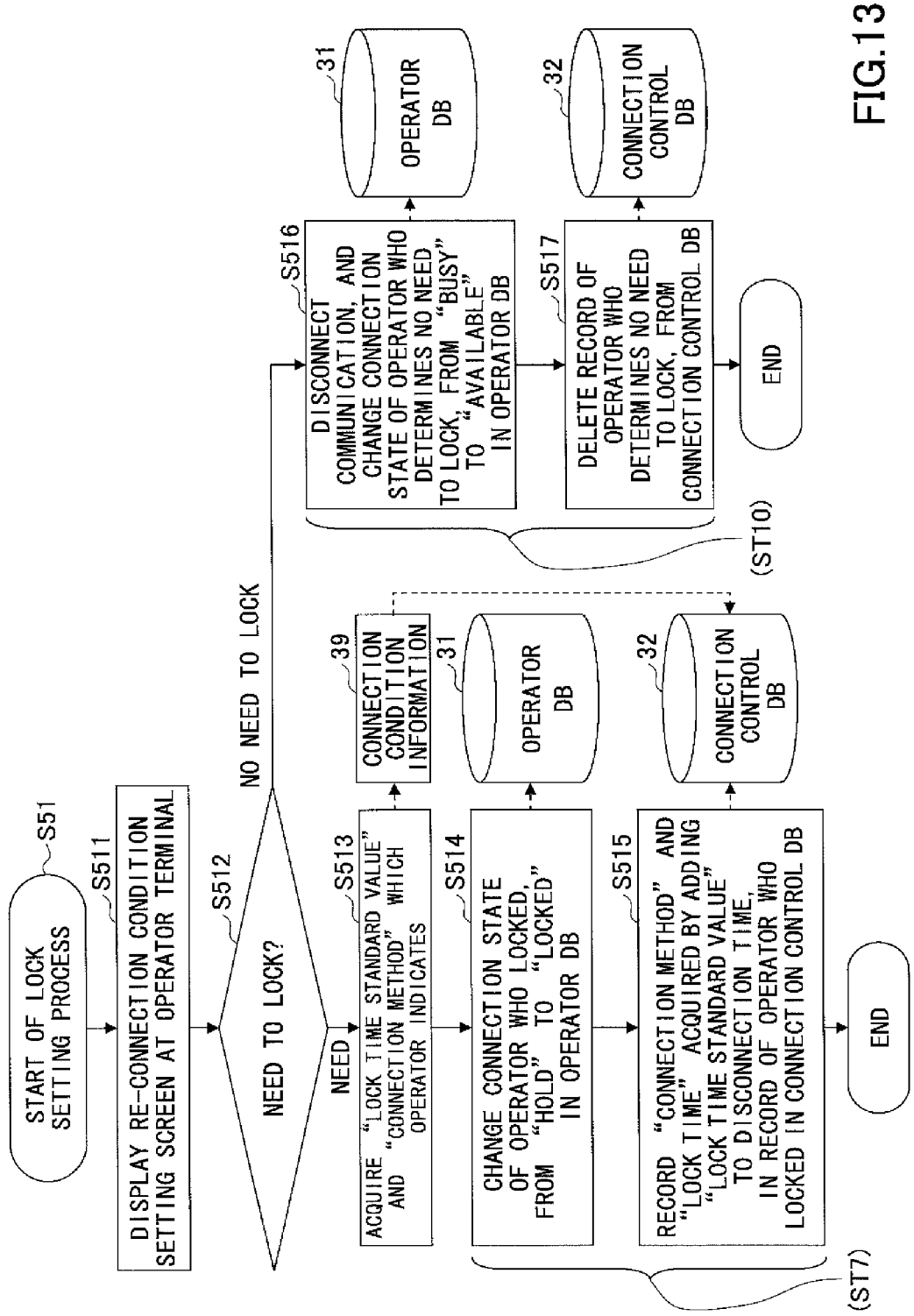
FIG. 13 is a flowchart for explaining a lock setting process in step S51 in FIG. 12.

FIG. 13 is a flowchart for explaining the lock setting process in step S51 in FIG. 12. In FIG. 13, the lock setting part 43 displays the re-connection condition setting screen 300 at the display device 231 of the operator terminal 200 (step S511).

The lock setting part 43 determines whether the connection condition acquired from the operator of the operator terminal 200 indicates to lock (step S512). In a case in which the operator selects options from the lock time standard value selection 301 and the connection method selection 302 at the re-connection condition setting screen 300 depicted in FIG. 16, if the lock time standard value and the connection method are included in the connection condition, it is determined that the lock is needed. When it is determined that the lock is needed, the lock setting part 43 acquires the lock time standard value and the connection method which are indicated by the operator, and stores connection condition information 39 indicating the lock time standard value and the connection method into a working area of the storage part 30 (step S513).

The lock setting part 43 changes the connection state of the operator who locked, from "HOLD" to "LOCKED" in the operator DB 31 (step S514).

The lock setting part 43 records the connection method stored in the working area of the storage part 30, and records the lock time acquired by adding the lock time standard value stored in the working area of the storage part 30 to the disconnected time, in the record of the operator who sets the lock in the connection control DB 32 (step S515). The lock setting part 43 terminates the lock setting process.

On the other hand, when it is determined in step S512 that the operator selects the "NO NEED" button 303 from the re-connection condition setting screen 300, the lock setting part 43 disconnects the communication, and changes the connection status of the operator from "HOLD" to "AVAILABLE" in the operator DB 31 (step S516). Also, the lock setting part 43 deletes the record of the operator from the connection control DB 32 (step S517), and terminates the lock setting process.

In the above described lock setting process, steps S514 and S515 correspond to the locked state (ST7) in FIG. 6, and steps S516 and S517 correspond to the available state (ST10) in FIG. 6.

Figure 14:
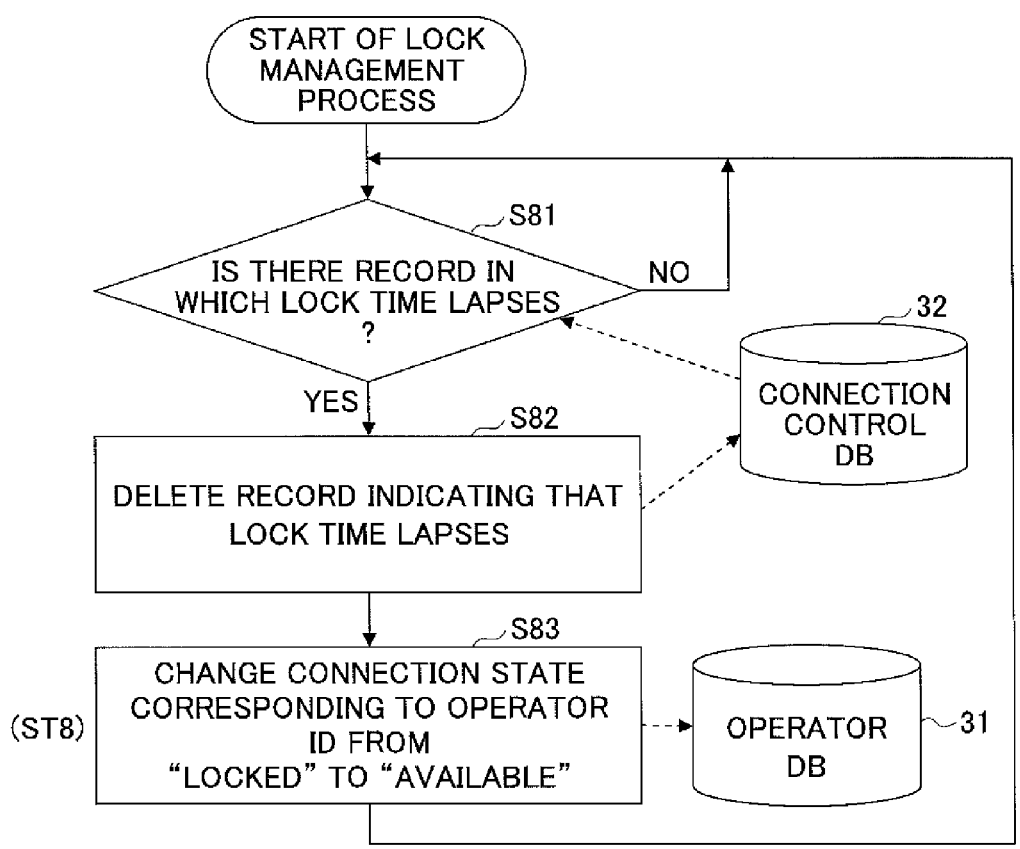
FIG. 14 is a flowchart for explaining a lock management process by a lock management part of a connection control processing part.

Next, a lock management process, which is conducted by the lock management part 44 of the connection control processing part 40, will be described with reference to FIG. 14. FIG. 14 is a flowchart for explaining the lock management process conducted by the lock management part 44 of the connection control processing part 40. In FIG. 14, the lock management part 44 repeats processes from step S81 to step S83.

The lock management part 44 determines whether there is a record in the connection control DB 32 in which the lock time lapses (step S81). When there is no record in which the lock time lapses, the lock management part 44 goes back to step S81.

When there is a record in which the lock time lapses, the lock management part 44 deletes the record of interest from the connection control DB 32 after the operator ID is acquired from the record (step S82). Moreover, the lock management part 44 changes the connection state corresponded to the operator ID acquired in step S82, from "LOCKED" to "AVAILABLE" in the operator DB 31 (step S83). The lock management part 44 goes back to step S82 and repeats the above described processes.

In the above described lock management process, step S28 corresponds to the available state (ST8) in FIG. 6.

Figure 15:
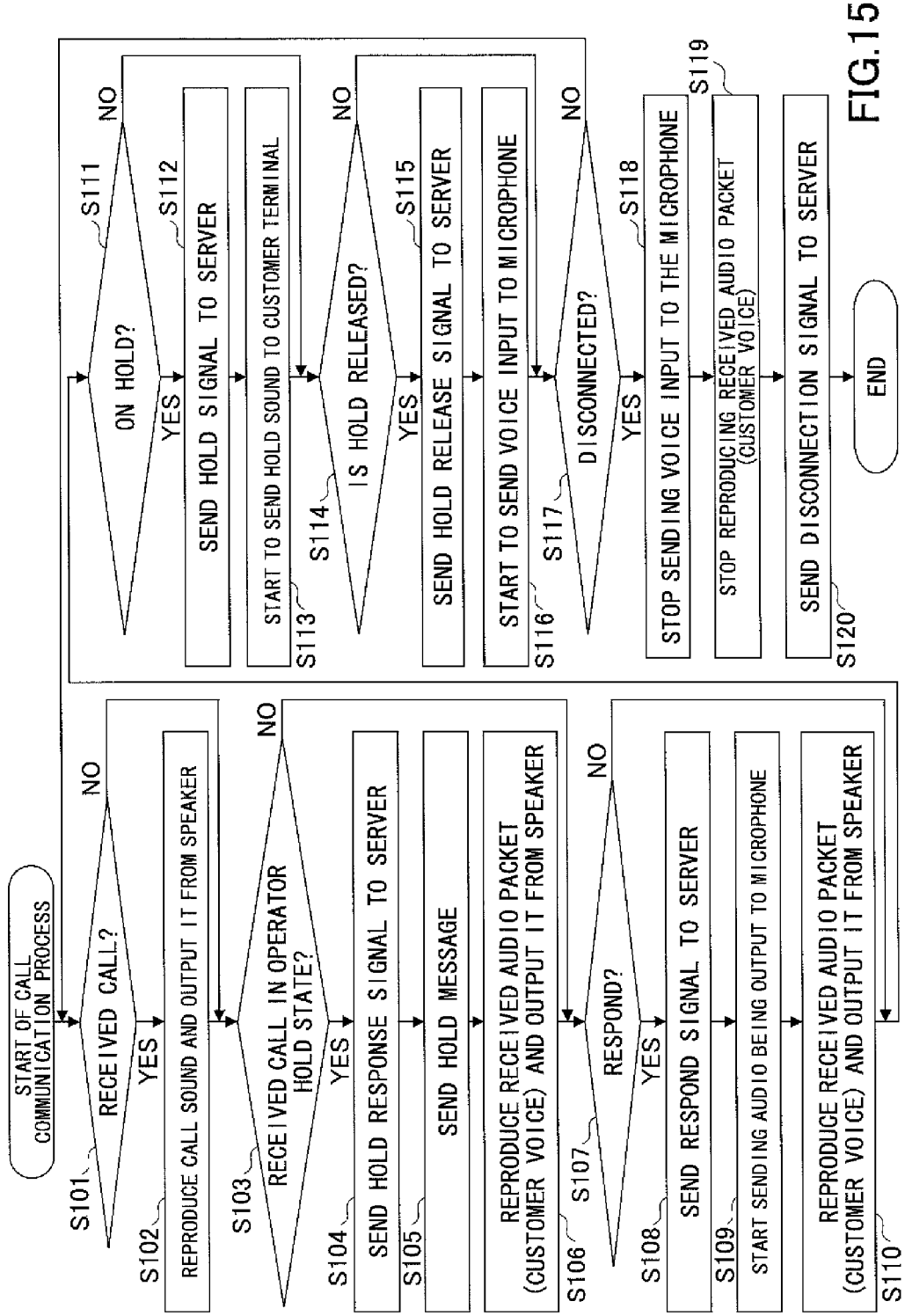
FIG. 15 is a diagram for explaining a call communication process by a call communication part of an operator terminal.

Next, a call communication process at the operator terminal 200 will be described with reference to FIG. 15. FIG. 15 is diagram for explaining the call communication process by the call communication part 71 of the operator terminal 200. In FIG. 15, the call communication part 71 repeats steps S101 to S120 every detection of receiving the packets from the server 100 or of an event caused by the operation of the operator.

In the operator terminal 200, the call communication part 71 determines whether a detection event is received (step S101). When the detection event is not received, the call communication part 71 advances to step S103. When the detection event is received, the call communication part 71 reports the audio output processing part 75 that the detection event is received, so as to reproduce a call sound and output the sound from the speaker 236 (step S102).

The call communication part 71 determines whether the detection event indicates a receive-on-hold, that is, whether a call is received from the same customer in a state in which the operator holds the communication (step S103). When the detection event does not indicate the receive-on-hold, the call communication part 71 advances to step S107. The receive-on-hold indicates that a re-connection request is received from the customer terminal 9 in the locked state (ST7) (in FIG. 9).

When the detection event indicates the receive-on-hold, the call communication part 71 sends a hold response signal to the server 100, instead of reproducing the call sound (step S104). Moreover, the call communication part 71 sends a hold message of audio data, which is recorded beforehand in the auxiliary storage device 217, to the customer terminal 9 through the server 100 (step S105). Furthermore, the call communication part 71 reproduces the customer voice from the audio packets, which are received from the customer terminal 9, by the audio output processing part 75, and outputs the customer voice from the speaker 236 (step S106).

In the embodiment, the call communication part 71 suppresses outputting the hold message, which is sent to the customer terminal 9, from the speaker 236. Instead, the call communication part 71 controls to output the audio packets received from the customer terminal from the speaker 236. By this control, it is possible for the operator to determine an appearance of the customer based on the customer voice output from the speaker 236 while successively working in the hold state.

Figure 17:
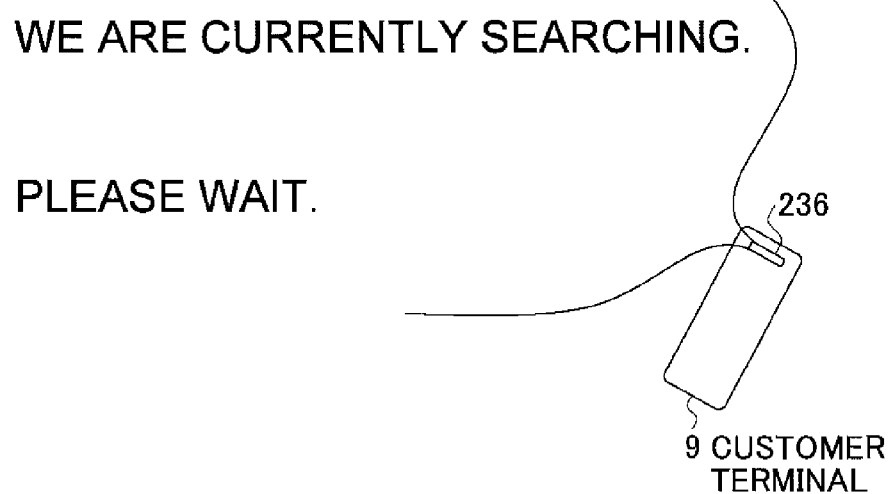
FIG. 17 is a diagram illustrating an example of a hold message.

The hold message sent to the customer terminal 9 in step S105 may be output from a speaker of the customer terminal 9 as a message "WE ARE CURRENTLY SEARCHING. PLEASE WAIT." as depicted in FIG. 17.

The call communication part 71 determines whether the detection event indicates that the operator responds (step S107). When the detection event does not indicate that the operator responds, the call communication part 71 advances to step S111.

On the other hand, when the detection event does indicate that the operator responds in step S107, the call communication part 71 sends a response signal to the server 100 (step S108). Also, the call communication part 71 processes operator voice input to the microphone 235 into the audio packets by the audio input processing part 76, and starts sending the audio packets to the customer terminal 9 through the server 100 (step S109). Moreover, the call communication part 71 instructs the audio output processing part 75 to reproduce the audio packets (the customer voice) received from the customer terminal 9 and to output the customer voice from the speaker 236 (step S110).

The call communication part 71 determines whether the detection event indicates that the operator holds the communication (step S111). When the detection event does not indicate that the operator holds the communication, the call communication part 71 advances to step S114. On the other hand, when the detection event indicates that the operator holds the communication, the call communication part 71 sends the hold signal to the server 100 (step S112), and starts to send the hold sound to the customer terminal 9 through the server 100 (step S113).

The call communication part 71 determines whether the detection event indicates hold release (step S114). When the detection event does not indicate the hold release, the call communication part 71 advances to step S117. On the other hand, when the detection event indicates the hold release, the call communication part 71 sends a hold release signal to the server 100 (step S115). Also, the call communication part 71 processes the operator voice input to the microphone 235 into the audio packets by the audio input processing part 76, and starts to send the audio packets to the customer terminal 9 through the server 100 (step S116).

The call communication part 71 determines whether the detection event indicates that the operator disconnects (step S117). When the detection event does not indicate that the operator disconnected, the call communication part 71 goes back to step S101, and repeats the above described processes. On the other hand, when the detection event indicates that the operator disconnected, the call communication part 71 stops sending the operator voice input into the microphone 235 (step S118). Also, the call communication part 71 stops reproducing the audio packets (the customer voice) received from the customer terminal 9 (step S119), and sends a disconnection signal to the server 100 (step S120). After that, the call communication part 71 terminates the call communication process.

As described above, in the embodiment, when the call is held, the operator terminal 200 is set to on-hook. Accordingly, it is possible for the operator to comprehend the circumstance of the customer in the hold state since the voice of the customer is output from the operator terminal 200. Moreover, by displaying the re-connection condition setting screen 300 at the operator terminal 200 as depicted in FIG. 16 in response to the disconnection in the hold state, it is possible for the operator to visually confirm the disconnection of the line.

When the line is disconnected during the hold state in which the operator held, it is possible for the operator to select whether to lock the line of the operator terminal 200 in order to receive the re-connection request from the same customer terminal 9 at the re-connection condition setting screen 300 as depicted in FIG. 16.

Moreover, when the operator selects to lock the line, it is possible for the operator to select to connect the line for the re-connection request (a re-connection on-lock) sent from the same customer terminal 9 while retaining the hold state in which the operator does not need the accepting and responding operation, or to respond due to the call sound similar to the regular connection and have a conversation with the customer.

Accordingly, it is possible for the operator to select a response manner for the customer in consideration for the circumstance of the disconnection during the hold state.

In a case in which the line connection is selected in response to the re-connection on-lock while retaining the hold state, even if the re-connection request is received from the customer terminal 9 due to the line disconnection after the operator held the communication with the customer of the customer terminal 9 to search for an answer to the inquiry of the customer, it is possible for the operator of the call center to concentrate on his/her work to respond to the inquiry without the accepting and responding operation. As a result, it is possible for the operator to perform substantial response work faster.

Furthermore, it is possible for the operator to determine the circumstance in which the communication is disconnected based on the voice of the customer output from the operator terminal 200, and to indicate a longer time, "5 MIN", to the lock time with respect to the customer with which the communication is disconnected due to a poor radio wave condition. For the customer who unilaterally disconnected the communication, the operator may indicate a shorter time, "1 MIN", for the lock time. Alternatively, the operator may decide not to lock the line so as to receive the call of another new customer.

In a case in which the operator selects to be called and conduct a response operation in response to the re-connection on-lock, it is possible for the operator to have a conversation in consideration of the circumstance of the customer for whom the line disconnected during the hold state, and to properly correspond to the re-connection. In a case in which the hold state becomes longer and the customer can not wait and disconnects the line, the operator preferably explains a work state and the like to the customer when the line is re-connected.

In the embodiment, by setting the on-hook to the operator terminal 200 for the operator to hear the voice of the customer, when the communication is disconnected during the hold state, it is possible for the operator to properly set the connection condition with respect to the re-connection request from the same customer. Accordingly, when the re-connection request is received, it is possible to connect the line in accordance with the connection condition set by the operator.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A line connection apparatus, comprising:
   a processor; and
   a storage part;
   wherein the processor performs
      holding a line when a hold is recognized, by
         setting on-hook to a first person terminal of a first person who holds the line,
         outputting voice of a second person to the first person terminal in a state of suppressing an output of a hold message to the first person terminal, the hold message being transmitted to a second person terminal of the second person for whom the line is held from the first person terminal, and
      recording first person identification information and second person identification information in a connection control database stored in the storage part in which the second person identification information is associated with the first person identification information, the first person identification information identifying the first person, the second person identification information identifying the second person, the connection control database for managing holding the line and releasing the hold of the line;
      setting a lock by
         acquiring a connection condition to lock the line in order for the first person terminal to receive a re-connection request from a same second person which is made after a disconnection in a hold state, from the first person based on the first person identification information in which the line is disconnected, when the disconnection of the line being held is recognized, and
         storing the connection condition in association with the first person identification information; and
      controlling a connection, in response to the re-connection request by the second person after the disconnection in the hold state between the first person and the second person, by
         referring to the connection control database stored in the storage part, and
         having the first person terminal receive the re-connection request based on the first person identification information corresponding to the second person identification information in accordance with the connection condition in association with the first person identification information which is associated with the second person identification information indicated by the re-connection request.

2. The line connection apparatus as claimed in claim 1, wherein the setting the lock includes
   determining whether to lock the line based on the connection condition;
   setting a connection method and a lock time by corresponding to the first person identification information in the connection control database when the determining determines to lock the line, the connection method indicated by the connection condition acquired from the first person, the lock time acquired by adding a lock time standard value indicated by the connection condition to a disconnected time.

3. The line connection apparatus as claimed in claim 2, wherein the setting the lock deletes a record of the first person identification information from the connection control database when the determining determines not to lock the line.

4. The line connection apparatus as claimed in claim 2, wherein
   the connection method indicates a connection-on-hold in which the first person terminal receives a call while the hold is being retained, or a regular connection in which the first person responds and receives the call in response to a call sound of the first person terminal, and
   the process further performs re-connecting the line, in response to an instruction of the re-connection, by
      acquiring the connection method corresponding to the first person identification information which is specified by referring the connection control database by using the second person identification information, and having the first person terminal of the first person in the hold state, and setting the lock time corresponding to the second person identification information to blank.

5. The line connection apparatus as claimed in claim 4, wherein when the connection method indicates the regular connection, the re-connecting has the first person terminal make the call sound for the first person to respond, has the first person terminal receive the call, and deletes a record of the first person identification information from the connection control database.

6. The line connection apparatus as claimed in claim 5, wherein the line connection apparatus is placed at a call center, the first person identification information indicates identification information identifying an operator, and the second person identification information indicates a telephone number of the second person terminal, and the storage part further stores an operator database in which the connection state of the line is maintained by corresponding to the identification information of the operator, wherein the connection state is set to the hold state when the hold is recognized by the holding the line, and the connection state is set to a locked state when the connection method indicates the connection-on-hold, and is set to blank when the connection method indicates the regular connection, by the setting the lock.

7. The line connection apparatus as claimed in claim 5, further comprising managing the lock by deleting a record in which the lock time lapses, from the connection control database.

8. A line connection method, performed in a computer, the method comprising:

holding a line when a hold is recognized, by the computer which setting on-hook to a first person terminal of a first person who holds the line, outputting voice of a second person to the first person terminal in a state of suppressing an output of a hold message to the first person terminal, the hold message being transmitted to a second person terminal of the second person for whom the line is held from the first person terminal, and recording first person identification information and second person identification information in a connection control database stored in a storage part in which the second person identification information is associated with the first person identification information, the first person identification information identifying the first person, the second person identification information identifying the second person, the connection control database for managing holding the line and releasing the hold of the line;

setting a lock by the computer which acquires a connection condition to lock the line in order for the first person terminal to receive a re-connection request from the second person which is made after a disconnection in a hold state, from the first person based on the first person identification information in which the line is disconnected, when the disconnection of the line being held is recognized, and storing the connection condition in association with the first person identification information; and controlling a connection, in response to the re-connection request by the second person after the disconnection in the hold state between the first person and the second person, by the computer which refers to the connection control database stored in the storage part, and has the first person terminal receive the re-connection request based on the first person identification information corresponding to the second person identification information in accordance with the connection condition in association with the first person identification information which is associated with the second person identification information indicated by the re-connection request.

9. A non-transitory computer-readable recording medium storing a program which, when executed by a computer, causes the computer to perform a line control process comprising:

holding a line when a hold is recognized, by setting on-hook to a first person terminal of a first person who holds the line, outputting voice of a second person to the first person terminal in a state of suppressing an output of a hold message to the first person terminal, the hold message being transmitted to a second person terminal of the second person for whom the line is held from the first person terminal, and recording first person identification information and second person identification information in a connection control database stored in a storage part in which the second person identification information is associated with the first person identification information, the first person identification information identifying the first person, the second person identification information identifying the second person, the connection control database for managing holding the line and releasing the hold of the line;

setting a lock by acquiring a connection condition to lock the line in order for the first person terminal to receive a re-connection request from the second person which is made after a disconnection in a hold state, from the first person based on the first person identification information in which the line is disconnected, when the disconnection of the line being held is recognized, and storing the connection condition in association with the first person identification information; and controlling a connection, in response to the re-connection request by the second person after the disconnection in the hold state between the first person and the second person, by referring to the connection control database stored in the storage part, and having the first person terminal receive the re-connection request based on the first person identification information corresponding to the second person identification information in accordance with the connection condition in association with the first person identification information which is associated with the second person identification information indicated by the re-connection request.

* * * * *